(12) United States Patent
Nose et al.

(10) Patent No.: US 6,507,836 B1
(45) Date of Patent: Jan. 14, 2003

(54) DATA SEARCH METHOD WITH EACH DATA ITEM DISPLAYED IN A FILTER AT A POSITION ASSOCIATED WITH AN ATTRIBUTE VALUE OF THE DATA ITEM

(75) Inventors: Yasuhiro Nose, Tenri (JP); Naoki Urano, Sakai (JP); Masafumi Hirata, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/525,458

(22) Filed: Mar. 15, 2000

(30) Foreign Application Priority Data

Mar. 31, 1999 (JP) ............................................ 11-090807

(51) Int. Cl.[7] .............................................. G06F 17/30

(52) U.S. Cl. ....................... 707/3; 707/2; 707/4; 707/5

(58) Field of Search ............................... 707/2, 3, 102, 707/4, 201, 5

(56) References Cited

U.S. PATENT DOCUMENTS 5,544,358 A * 8/1996 Capps et al. ................. 707/102
5,787,411 A * 7/1998 Groff et al. ..................... 707/2

FOREIGN PATENT DOCUMENTS

| JP | A096791 | 1/1997 | | |
| JP | A11154153 | 6/1999 | | |
| WO | WO 98/47279 | * 10/1998 | ........... | G06F/17/30 |

* cited by examiner

Primary Examiner—Frantz Coby
(74) Attorney, Agent, or Firm—Birch, Stewart, Kolasch & Birch, LLP

(57) ABSTRACT

A data search method capable of representing a complex search condition with a reduced number of filters and allowing high data visibility is used in a data search system including a storage disposed to store a plurality of data to be administered and attribute values associated with a desired number of attributes and respectively assigned to the plurality of data, a display, an input unit receiving an instruction from a user to perform an operation through a user operation to be performed on an object displayed on the display, and a data operation unit performing an operation on the plurality of data in response to the instruction received by the input unit. The data search method includes the steps of: creating a filter associated with a plurality of attribute values each associated with a predetermined display position; defining a data attribute and a data attribute value associated with the filter for search; using the data attribute and the data attribute value to search data; and displaying a symbol of retrieved data in the filter at a display position corresponding to an attribute value of the data.

12 Claims, 22 Drawing Sheets

DATA SEARCH METHOD WITH EACH DATA ITEM DISPLAYED IN A FILTER AT A POSITION ASSOCIATED WITH AN ATTRIBUTE VALUE OF THE DATA ITEM

BACKGROUND OF THE INVENTION

1. Field of the Invention

The present invention relates generally to data search methods and systems and particularly to methods and systems capable of searching data while maintaining high data visibility if complex search conditions are set.

2. Description of the Background Art

As computer systems are increasingly enhanced in performance and individuals each control much more data than before, it is important that the users can readily and rapidly obtain required data from an enormous amount of data. One such efficient data search method is proposed in Japanese Patent Laying-Open No. 9-6791.

In this data search method, a set of search results for one search condition is displayed in a closed area and a plurality of such areas are overlapped to display the data satisfying multiple search conditions at a portion where the multiple areas overlap.

For example, in FIG. 31A, a result of searching a database for the data including a keyword "vehicle" is displayed in an area 3201 and that of searching the database for the data including a keyword "character" is displayed in an area 3202. Each data may be displayed with an icon so that the content of the data can be recognized at a glance. If there is data belonging to both of areas 3201 and 3202, the data is indicated by icons displayed, one at an area, adjacent to each other (in FIG. 31A, "motor bike" and "bicycle"). This is convenient in searching for data satisfying more than one search condition. In FIG. 31B, areas 3201 and 3202 are overlapped to display at an overlapping area 3203 the icons of the data contained in both of areas 3201 and 3202. Thus the user can readily recognize the data satisfying more than one search condition, resulting in a reduced search time. An area for displaying a search result and a search condition associated therewith will together be referred to as a "filter".

In the data search method described above, however, a position in a filter at which an icon is displayed does not have any particular information other than that the icons of data belonging to more than one filter are displayed adjacent to each other. As such, if a search condition is complex and the number of filters is accordingly increased, high data visibility cannot be achieved.

For example, if a plurality of data having names of prefectures in Japan as attribute values are searched using a type of filter having the name of a prefecture as a search condition, then maximally as much as 47 filters, corresponding to the number of the prefectures in Japan, are required.

Furthermore, if a filter with "residentiary in the Kansai area" as a search condition and a filter with "male" as a search condition are used for AND search, any information other than the search conditions are not included in the result of the AND search. More specifically, if the user desires to obtain more specific information such as at which prefecture in the Kansai area a retrieved residentiary lives, then an additional filter must be applied. This increases the number of filters and thus degrades data visibility.

SUMMARY OF THE INVENTION

The present invention has been made to solve the disadvantage described above and contemplates a data search method and system with high data visibility, capable of representing complex search conditions with a reduced number of filters.

The present invention also contemplates a data search method allowing high data visibility if a large number of symbols are displayed in a filter.

The present invention also contemplates a data search method capable of varying an attribute value of data through a simple operation.

In one aspect of the present invention the data search method is used in a data search system including a storage disposed to store a plurality of data to be administered and attribute values associated with a desired number of attributes and respectively assigned to the plurality of data, a display, an input unit receiving an instruction to perform an operation from a user through a user operation to be performed on an object displayed on the display, and a data operation unit responsive to the instruction received by the input unit for performing an operation on the plurality of data. The data search method includes the steps of: creating a filter associated with a plurality of attribute values each associated with a predetermined display position; defining a data attribute and a data attribute value associated with the filter for search; using the data attribute and the data attribute value to search data; and displaying a symbol of retrieved data in the filter at a display position corresponding to an attribute value of the data.

In a filter each display position is associated with an attribute value. As such, if a complex search condition is used to search data, only a single filter suffices and without deteriorating data visibility the complex search condition can be used to search the data.

Preferably if the data retrieved has more than one attribute value the symbol of the data is displayed at a single position in the filters associated with more than one attribute value.

If the data has more than one attribute value each associated with a display position in a filter, the symbol of the data is displayed at a single display position in the filters associated with more than one attribute value. Thus the user can recognize at a glance that the data has more than one attribute value and high data visibility can thus be achieved.

Still preferably the step of displaying in the filter at a display position includes the steps of: determining whether a number of the data retrieved is an appropriate number for using symbols to display the data retrieved; if the number of the data searched is an appropriate number for using symbols to display the data retrieved, displaying a symbol of the data retrieved in the filter at a display position corresponding to an attribute value of the data; and if the number of the data retrieved is an inappropriate number for using symbols to display the data retrieved, allowing an user to select a representation for the data retrieved and, according to the selected representation, displaying the data retrieved in the filter.

If too much data satisfy a search condition associated with a filter, displaying symbols in the filter can result in degraded data visibility. Accordingly, the user is allowed to select a different type of data representation to display the data. Thus the data can be displayed without degraded visibility.

Still preferably the data search method further includes the steps of: detecting that in a filter an area has been selected; and enlarging and thus displaying the selected area and displaying in the enlarged and displayed area at a display position a symbol of data having an attribute value associated with the selected area.

When in a filter an area is selected the area is enlarged and displayed. As such, if in a selected area multiple symbols exist and result in a poor data visibility, enlarging and thus displaying the area can provide an enhanced data visibility.

Still preferably the data search method further includes the steps of: detecting that a symbol of data has been moved to and arrived at a filter associated with a plurality of attribute values each associated with a predetermined display position; and changing an attribute value of the data moved, to an attribute value associated with a display position corresponding to a destination of the data.

By moving a symbol of data in a filter from one position to any desired position, the data's attribute value can be changed to that associated with the display position corresponding to the destination of the data. Thus the data have an attribute value which can be changed through a simple operation.

In another aspect of the present invention the data search system includes: a storage disposed to store a plurality of data to be administered and attribute values associated with a desired number of attributes and respectively assigned to the plurality of data; a display; an input unit receiving an instruction to perform an operation from a user through a user operation to be performed on an object displayed on the display; a filter creation unit creating a filter associated with a plurality of attribute values each associated with a predetermined display position; an attribute definition unit defining a data attribute and a data attribute value associated with the filter for search; a data search unit using the data attribute and the data attribute value to search data; and a data display unit displaying a symbol of retrieved data in the filter at a display position depending on an attribute value of the data on the display.

In a filter each display position is associated with an attribute value. As such, if a complex search conditions is used to search data, only one filter suffices and without degraded data visibility the complex search condition can be used to search the data.

In still another aspect of the present invention a computer-readable recording medium stores a data search program allowing a computer to implement a data search method storing a plurality of data to be administered and attribute values associated with a desired number of attributes and respectively assigned to the plurality of data, and performing an operation on the plurality of data in response to an instruction to perform an operation from an user through a user operation to be performed on an object displayed on a display. The data search method includes the steps of: creating a filter associated with a plurality of attribute values each associated with a predetermined display position; defining a data attribute and a data attribute value associated with the filter for search; using the data attribute and the data attribute value to search data; and displaying a symbol of retrieved data in the filter at a display position corresponding to an attribute value of the data.

In a filter each display position is associated with an attribute value. As such, if a complex search condition is used to search data, only one filter suffices and without degraded data visibility the complex search condition can be used to search the data.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A data search system as one embodiment of the present invention will now be described with reference to the drawings.

Figure 1:
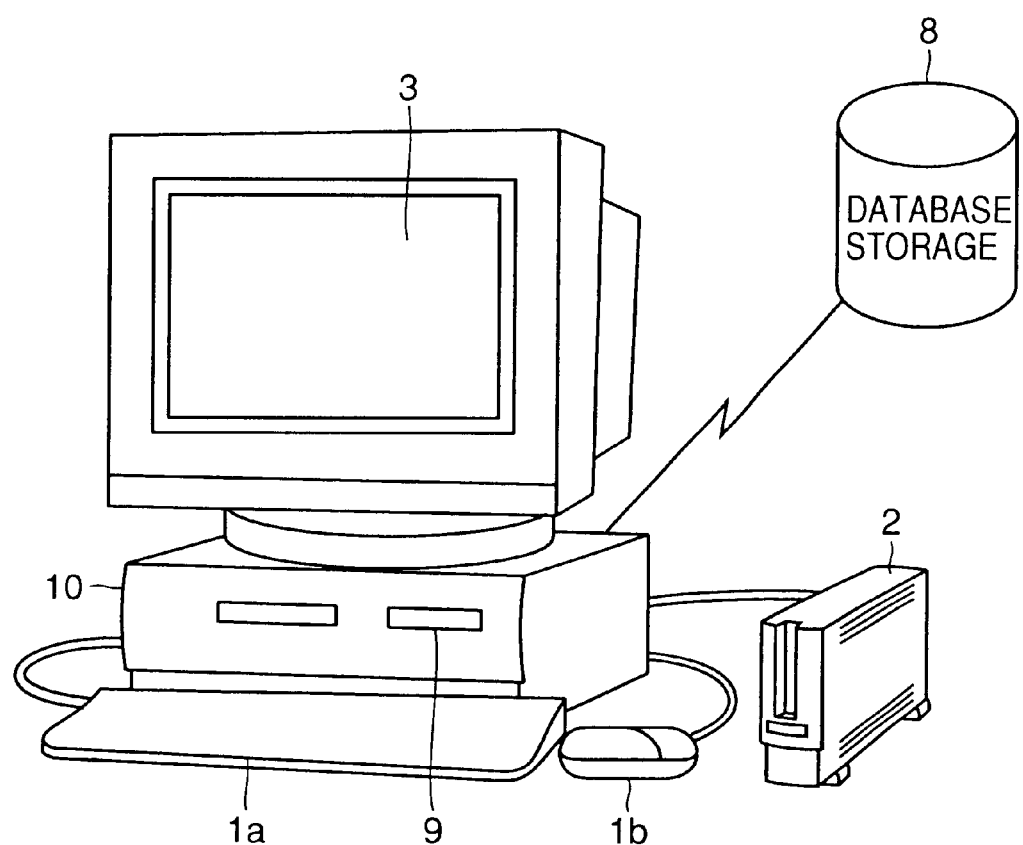
FIG. 1 shows an outer appearance of a configuration of a data search system according to one embodiment of the present invention.

Referring to FIG. 1, the data search system includes a processor 10 performing a data search process, a display 3 connected to processor 10, a keyboard 1*a* and a mouse 1*b* connected to processor 10 for transmitting instructions to processor 10, a hard disk drive 2 for storing a database and the like connected to processor 10, and a database 8 connected via a network.

Figure 2:
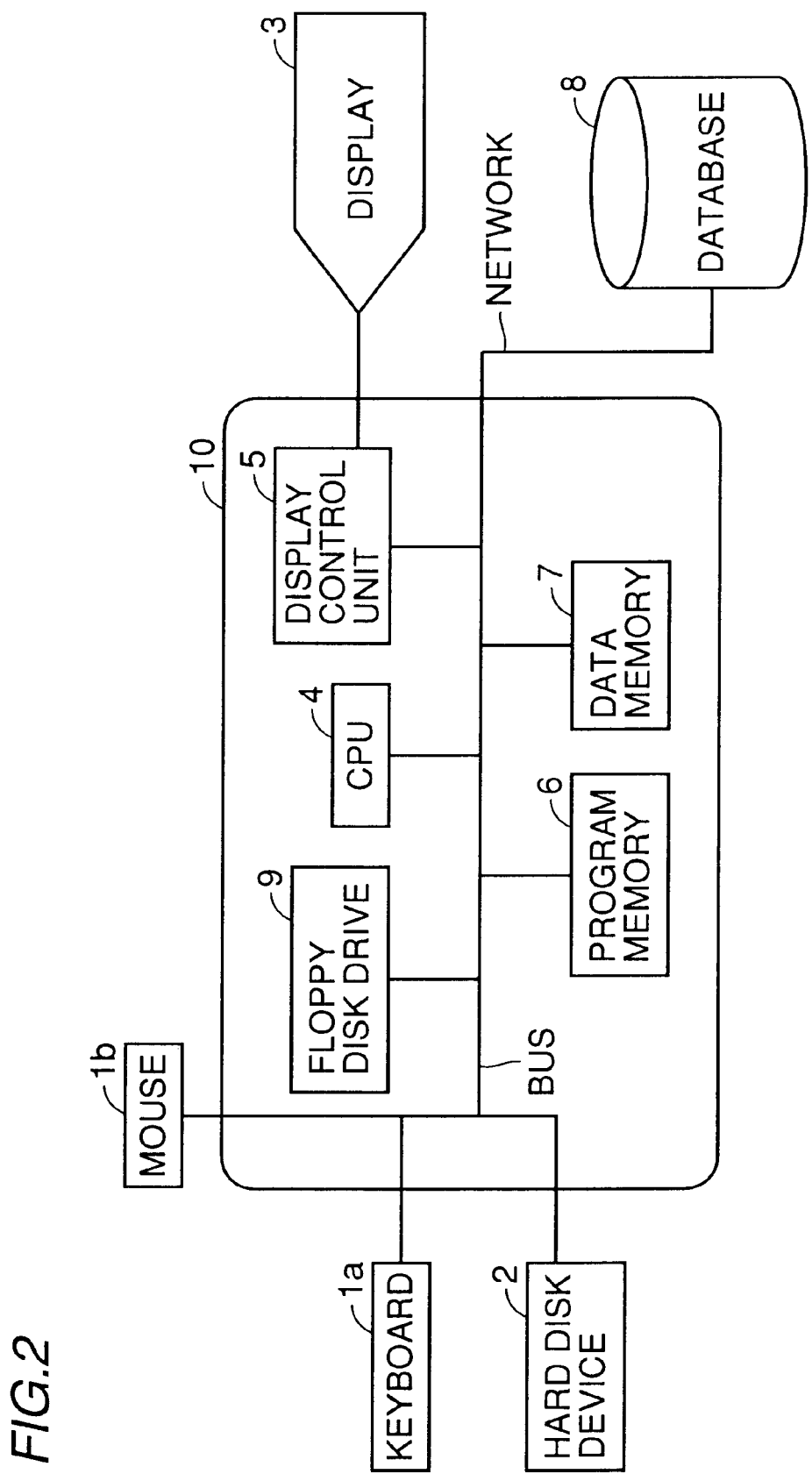
FIG. 2 represents a hardware configuration of a data search system according to one embodiment of the present invention.

Referring to FIG. 2, processor 10 includes a central processing unit (CPU) 4 performing a process such as data search, a program memory 6 storing a program of the data search process, a data memory 7 storing data having various types of attribute values, a display control unit 5 controlling the displaying of database 8, a floppy disk drive 9 reading a floppy disk (not shown) having a program or data stored therein, and a bus interconnecting floppy disk drive 9, CPU 4, display control unit 5, program memory 6, data memory 7 and the like.

Hereinafter a data search process performed in the data search system will be described with reference to the drawings. As an example, a process performed to search a set of data on the employees of a company for those who satisfy a desired condition, will be described. It should be noted that the data search process in the present invention is not limited in subject to be searched, search condition or type of representation.

Figure 3:
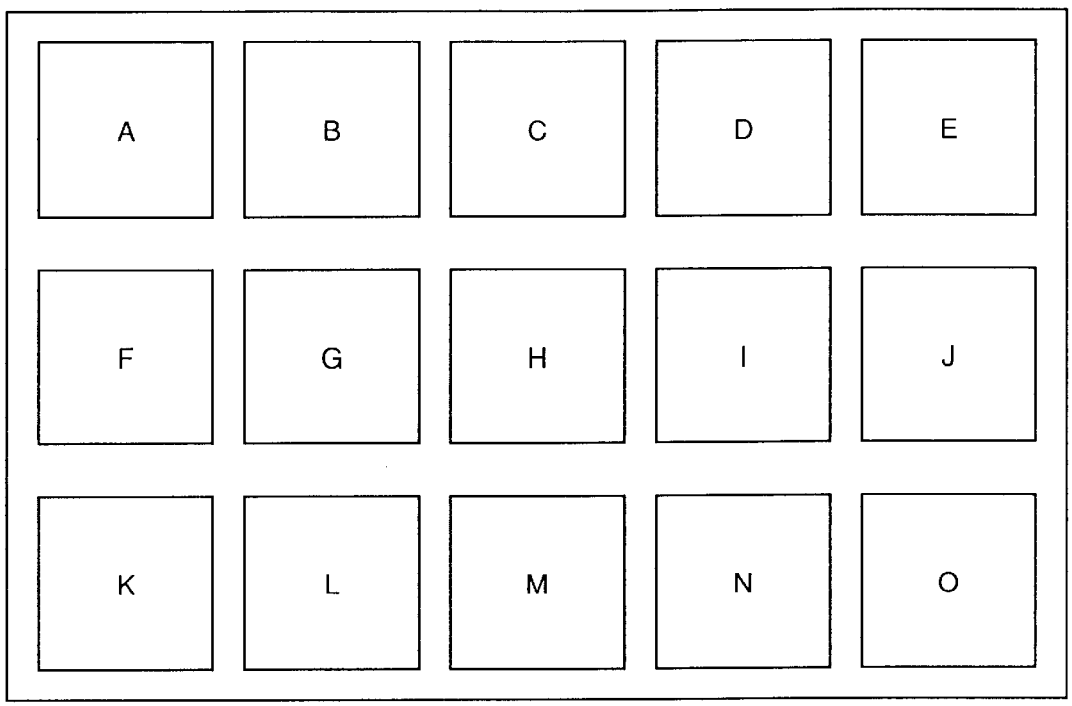
FIG. 3 is a view with icons displayed indicative of data on employees.

Referring to FIG. 3, the icons indicative of the data on all of the employees are displayed on display 3. Each icon is associated with the data on one employee. While on each icon an identification photograph is desirably displayed, herein for the sake of convenience such photographs are replaced with letters "A" to "O". The data on each employee is herein adapted to have attribute values corresponding to his or her name, address, telephone number, section, floor number, sex, height, blood type, birthday, schedule, calendar and the like.

Figure 4:
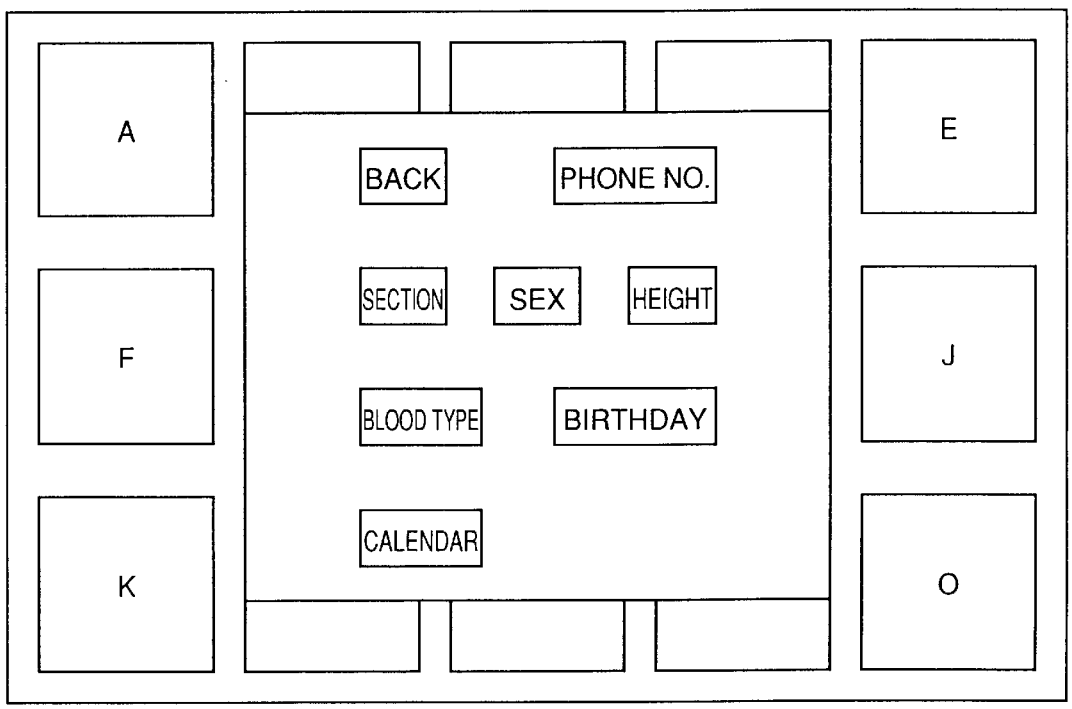
FIG. 4 shows an exemplary, attribute select screen.

An area is created for selecting an attribute to be searched. This area will be referred to as a "filter" hereinafter. Referring to FIG. 4, in the filter an attribute select screen is displayed, corresponding to a list of the attributes that the employee data has. The operator selects an attribute to be searched. At this point, a standard search condition that the attribute has is set. For example, when the attribute "address" is selected, a standard search condition "address in Japan" is set.

Figure 5:
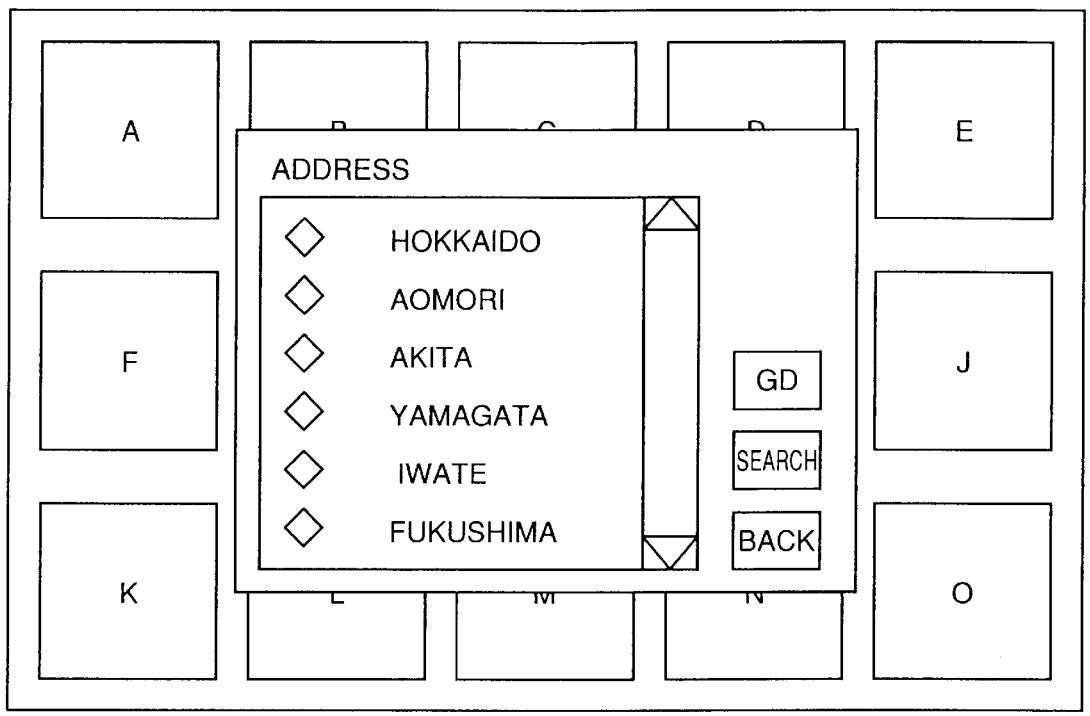
FIG. 5 shows an exemplary, attribute-value select screen.

When the attribute "address" is selected in FIG. 4, the screen is switched to such a screen as shown in FIG. 5. On this screen, the attribute "address" has been selected and the attribute values of the attribute are listed. Beside the list are displayed three buttons, i.e., a GRAPHICAL DISPLAY (GD) button, a SEARCH button and a BACK button. The screen as shown in FIG. 5 will be referred to as an attribute-value select screen.

Figure 6:
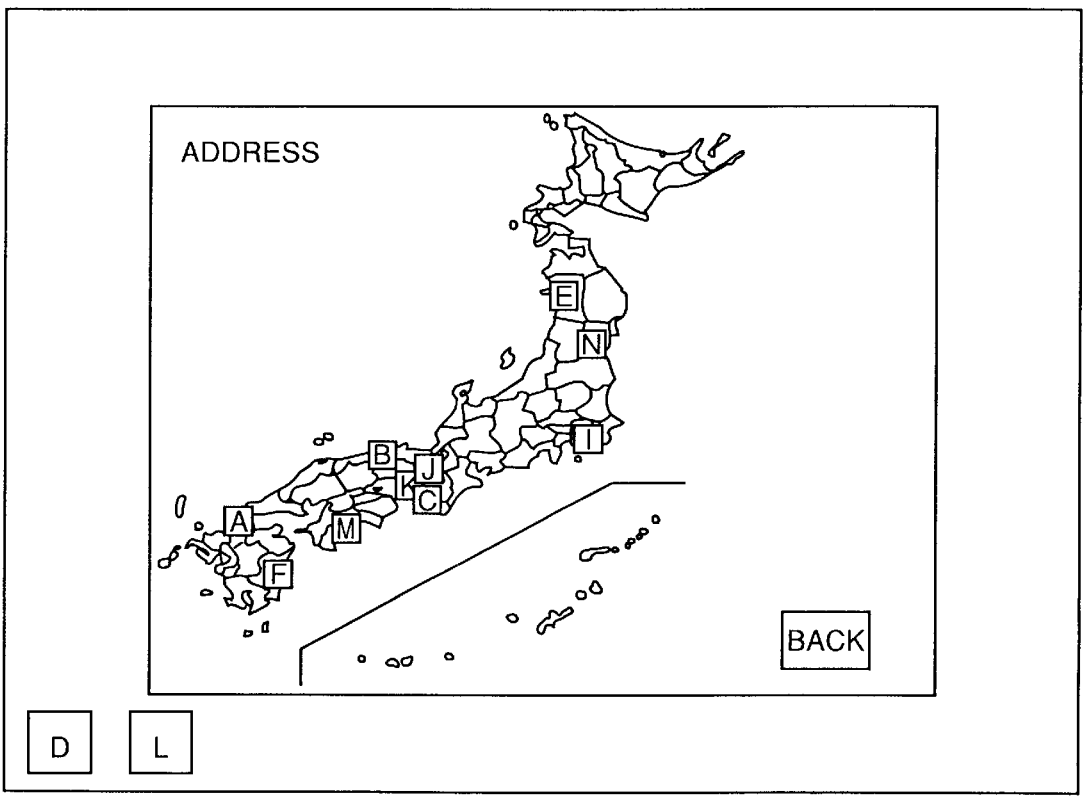
FIG. 6 is a view when a GRAPHICAL DISPLAY (GD) button is selected in conjunction with a search condition "address in Japan".

When on this screen the GD button is selected the data is searched according to the previously set, standard search condition "address in Japan". Referring to FIG. 6, after the data is searched a map of Japan and the BACK button are displayed in the filter and the icons associated with the data on any employees having their addresses in Japan are displayed on the map of Japan. Each icon is displayed at a position corresponding to the address of an employee. More specifically, an icon associated with the data having "Miyazaki prefecture" as an Address attribute value, or an icon F herein, is displayed on the map of Japan at Miyazaki prefecture. An icon associated with the data on an employee who does not have his or her address in Japan, or icons D and L herein, is displayed outside the map of Japan. When on the FIG. 6 screen the BACK button is selected, the FIG. 6 screen is switched back to the previous screen, i.e., the FIG. 5 attribute-value select screen.

Figure 7:
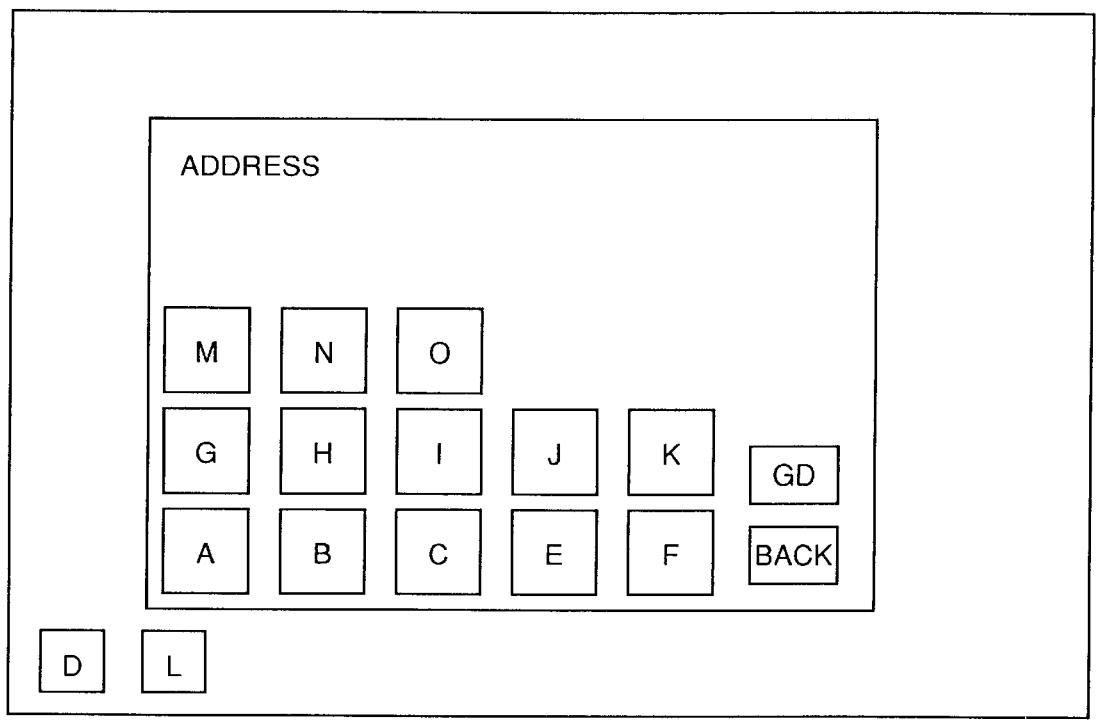
FIG. 7 is a view when a SEARCH button is selected in conjunction with the search condition "address in Japan".

When on the FIG. 5 attribute-value select screen the SEARCH button is selected, the data is searched according to the standard search condition "address in Japan", as is when the GD button is selected. Referring to FIG. 7, after the data is searched the screen is switched and the icons indicative of the data satisfying the search condition, i.e., those indicative of the data on the employees having their addresses in Japan are aligned and displayed in the filter. The icons indicative of the data that fail to satisfy the search condition, that is, those indicative of the data on the employees who do not have their addresses in Japan, i.e., icons D and L are aligned and displayed outside the filter.

When on this screen the GD button displayed in the filter is selected, the screen is switched to the same screen as the FIG. 6 map display screen described above. When on the FIG. 6 map display screen the BACK button is selected, the screen returns to the FIG. 7 display screen.

When on the FIG. 5 attribute-value select screen the BACK button is selected, the screen is switched to the screen displayed before the attribute-value select screen, i.e., the FIG. 4 attribute select screen.

Figure 8:
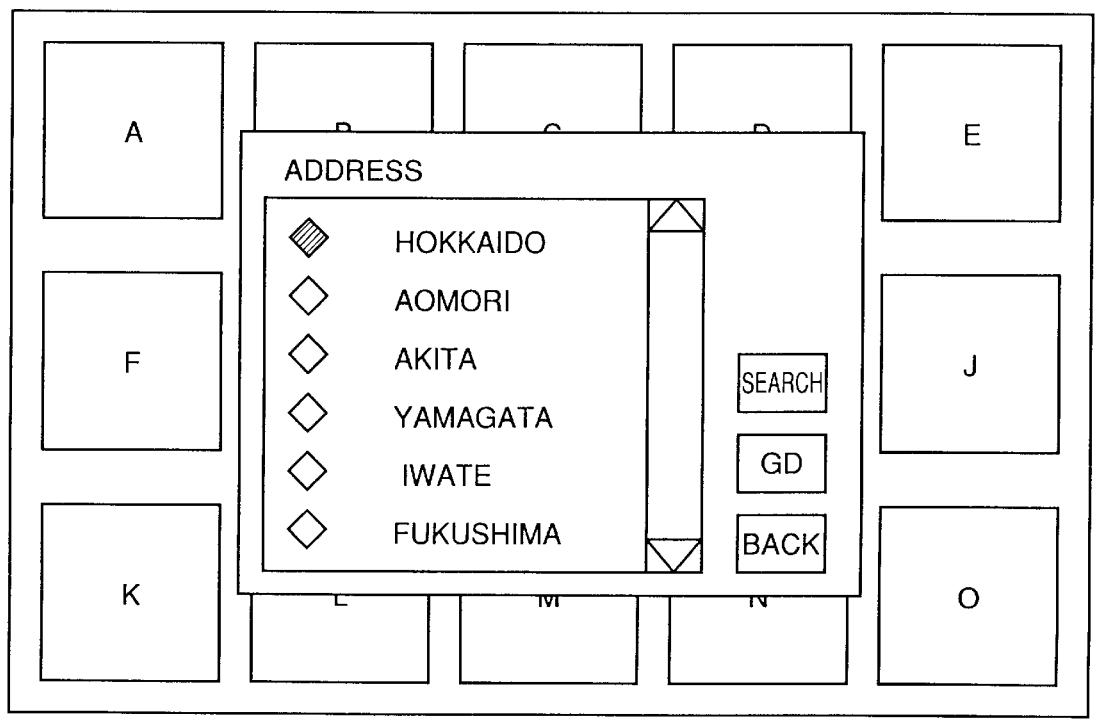
FIG. 8 is a view when an attribute value "Hokkaido" is selected on the attribute-value select screen.

When an attribute value is selected on the attribute-value select screen, the screen is switched to a screen capable of perceivably indicating that the attribute value has been selected. Referring to FIG. 8, when an attribute value "Hokkaido" is selected, the button displayed on the left hand of the selected attribute value "Hokkaido" is displayed with a color different than those displayed on the left hand of the other attribute values. This indicates that the user has selected the attribute value "Hokkaido".

Figure 9:
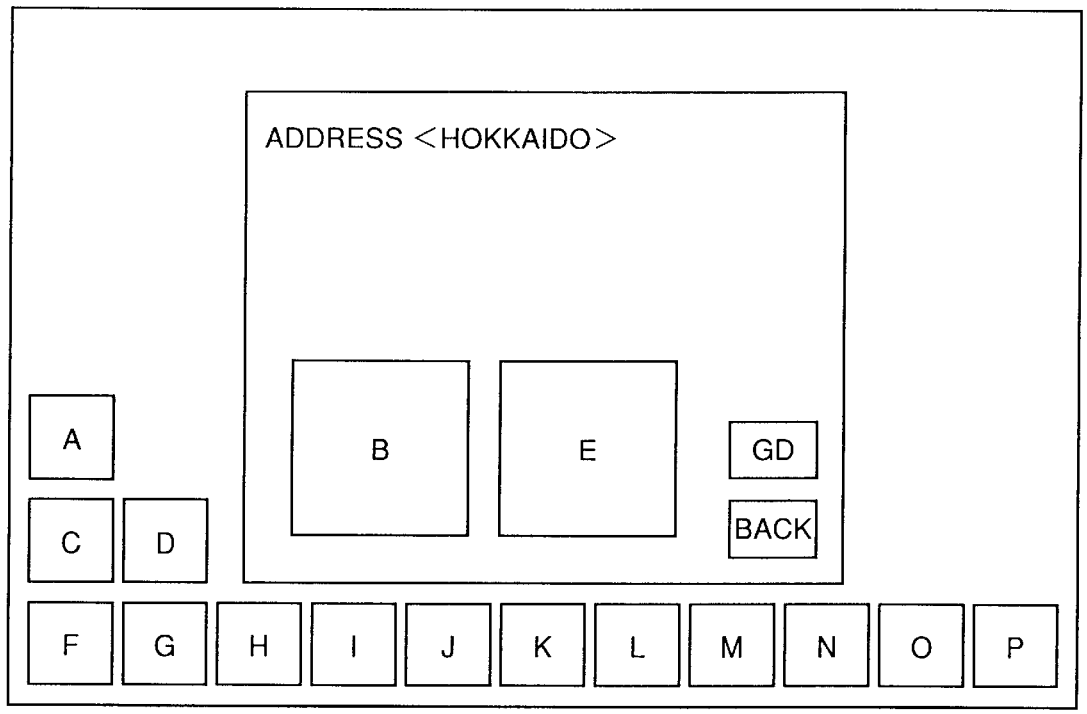
FIG. 9 is a view when the SEARCH button is selected with the attribute value "Hokkaido" used as a search condition.

When with an attribute value selected as described above the SEARCH button is selected, the data is searched with the selected attribute value as a search condition. Referring to FIG. 9, icons B and E, indicative of the data satisfying the search condition, are displayed in a filter associated with the search condition and icons indicative of the data that fail to satisfy the search condition are displayed outside the filter. In other words, the data on the employees corresponding to icons B and E have the attribute value "Hokkaido". When in FIG. 9 the BACK button is selected, the screen is switched to the FIG. 8 attribute-value select screen.

Figure 10:
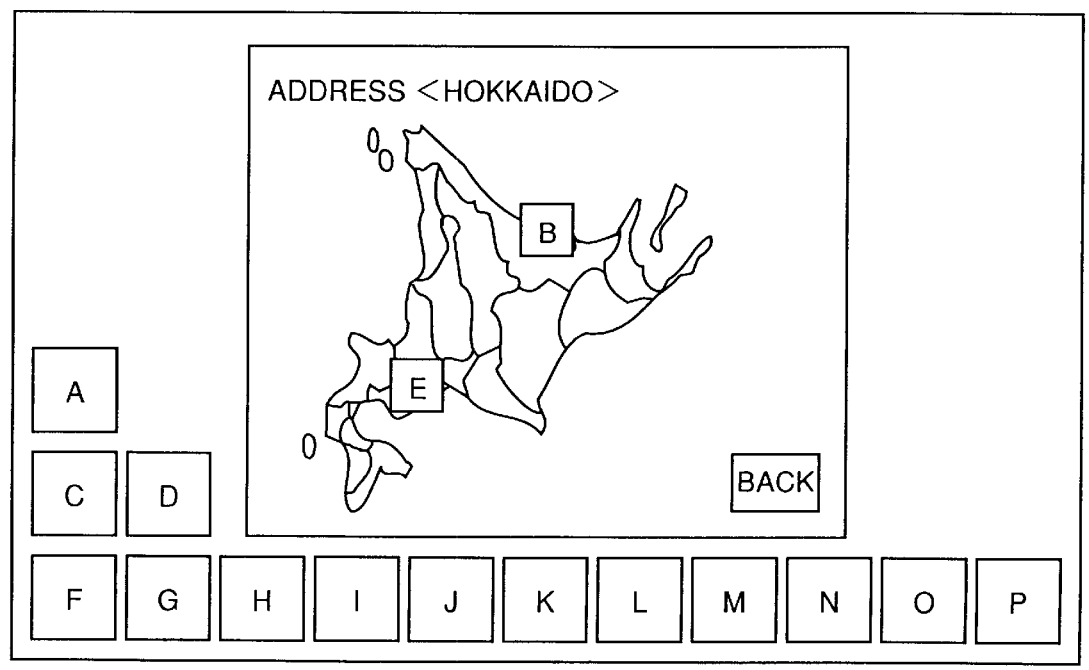
FIG. 10 is a view when the GD button is selected with the attribute value "Hokkaido" used as a search condition.

When in FIG. 9 the GD button is selected, a map of Hokkaido is displayed, as shown in FIG. 10, with icons B and E respectively displayed at the positions corresponding to the addresses of the employees corresponding to icons B and E. The icons associated with the data on the employees having their residential addresses outside Hokkaido are displayed outside the map of Hokkaido. When in FIG. 10 the BACK button is selected, the screen is switched to the FIG. 9 screen.

Figure 11:
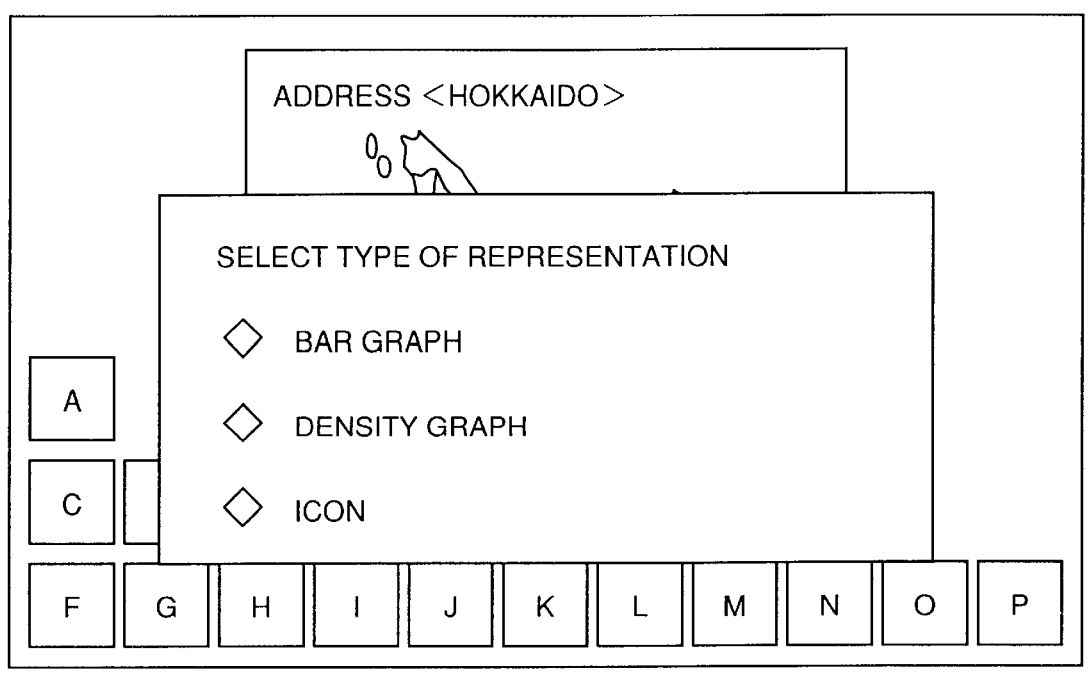
FIG. 11 shows a display screen for selecting from various types of representation.

When in FIG. 9 the GD button is selected and icons are to be displayed, as formatted, such as shown in FIG. 10, whether or not using the icons to display the data, as shown in FIG. 10, is appropriate is determined depending on how the icons to be displayed distribute or overlap. If displaying the icons, as shown in FIG. 10, is inappropriate, then a select screen is displayed, as shown in FIG. 11, to allow the user to select from three types of representation using a bar graph, a density graph with dots representing the data, and the icons as shown in FIG. 10. When the user selects one of the representations, a screen is displayed according to the selected representation.

Figure 12A:
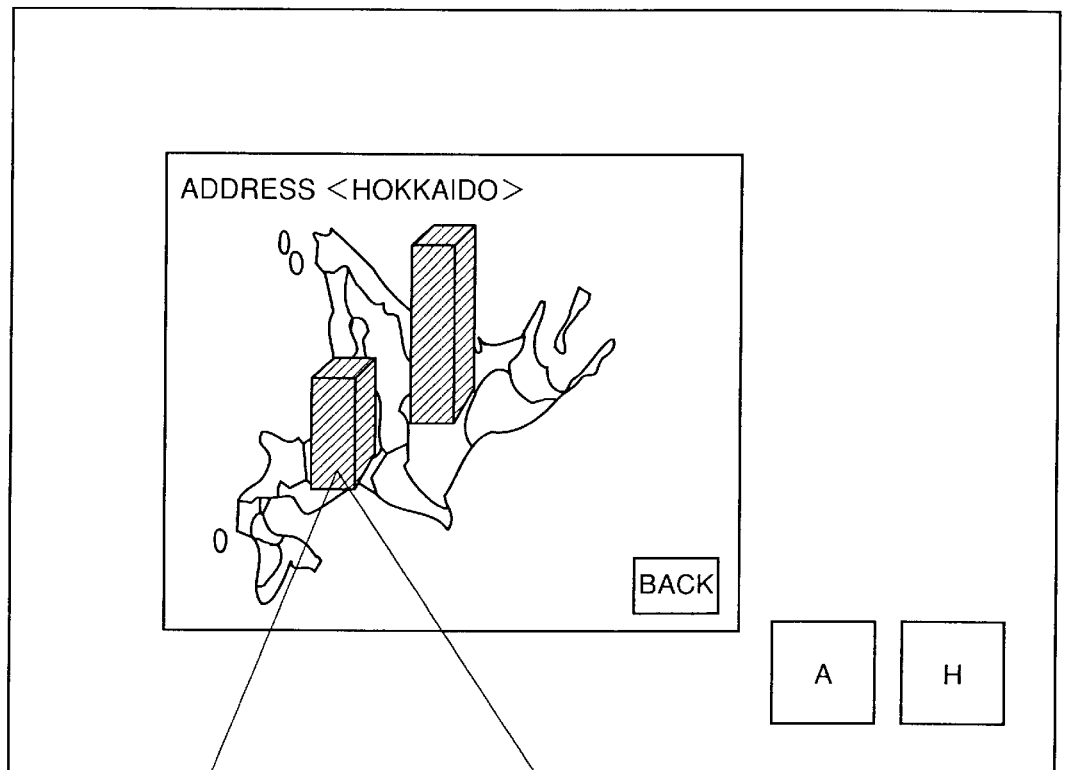
FIG. 12A shows that a bar graph representation is displayed and FIG. 12B shows an area displayed that is selected in a filter.
Figure 12B:
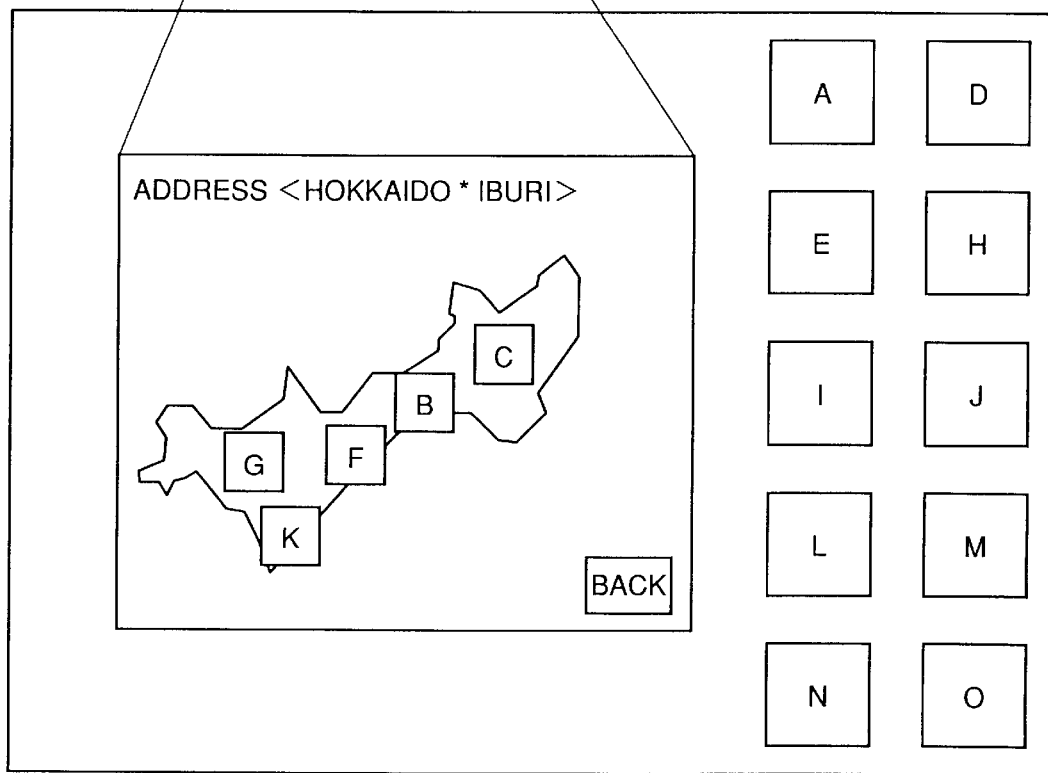

When the user selects the bar graph representation, for each area the number of the data included in the area is displayed in the form of a bar graph, as shown in FIG. 12A. When an area with a high data density that is displayed in FIG. 12A in the form of the bar graph is selected, the selected area is enlarged and displayed as shown in FIG. 12B.

Figure 13:
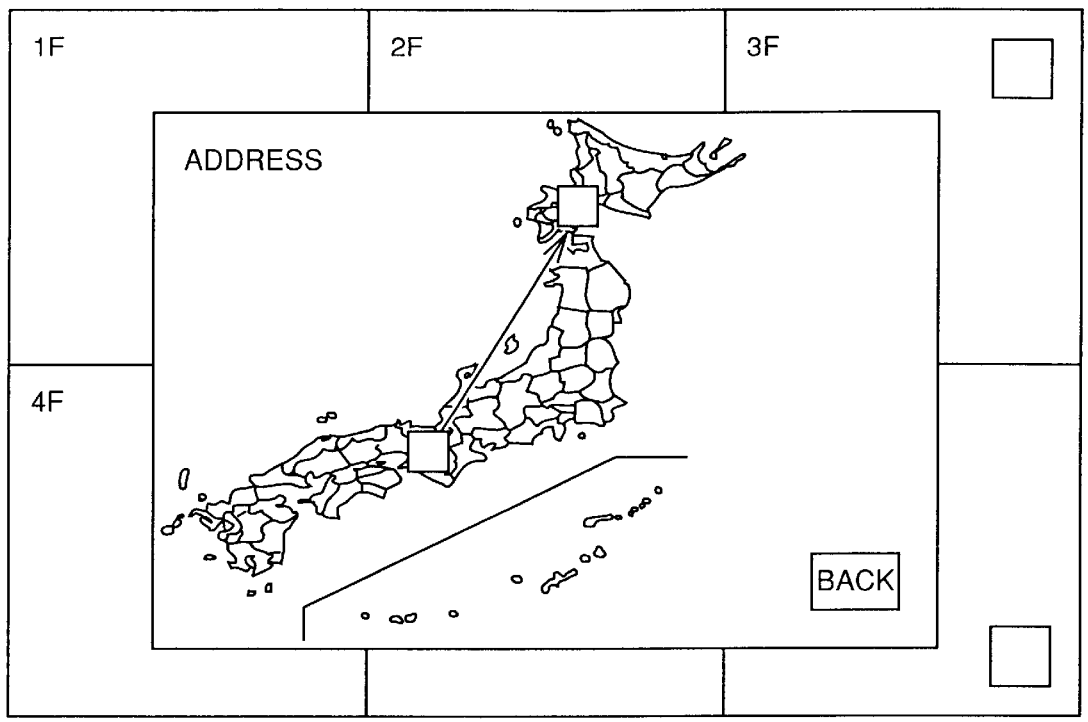
FIG. 13 illustrates that an icon is moved to change an attribute value.

Moving an icon in a filter allows an attribute value to be changed. Referring to FIG. 13, when an icon displayed on a map of Japan at Osaka prefecture is moved to Hokkaido, the Address attribute value of the data that the icon is associated with is changed from "Osaka prefecture" to "Hokkaido".

Figure 14:
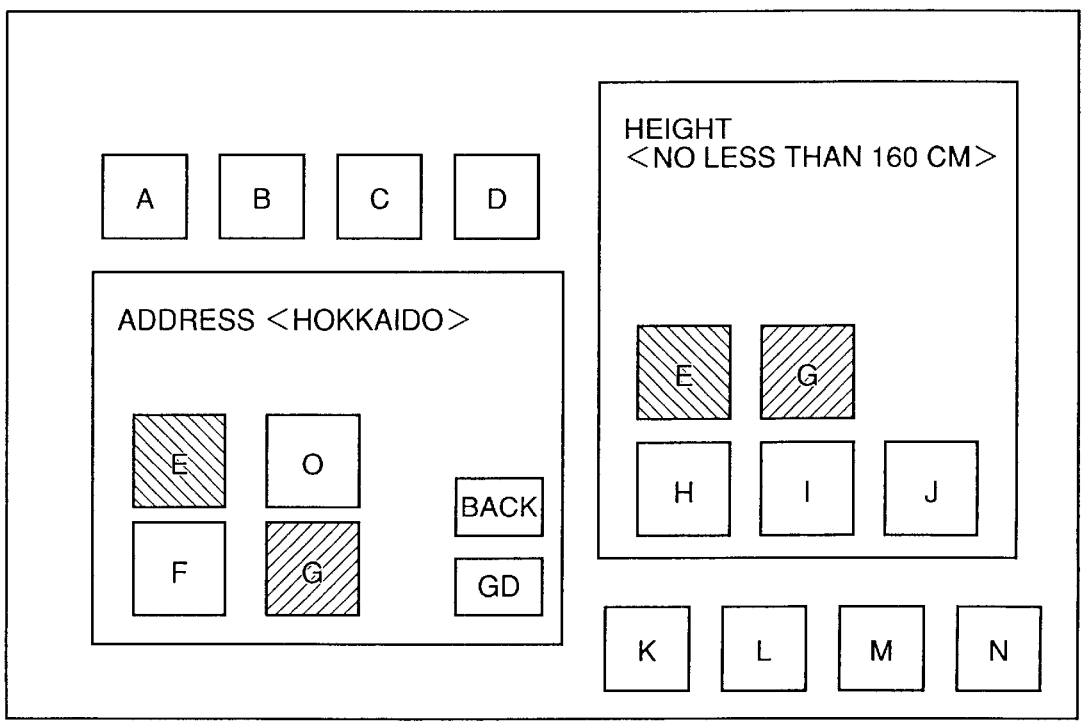
FIG. 14 is a view with two filters displayed.
Figure 15:
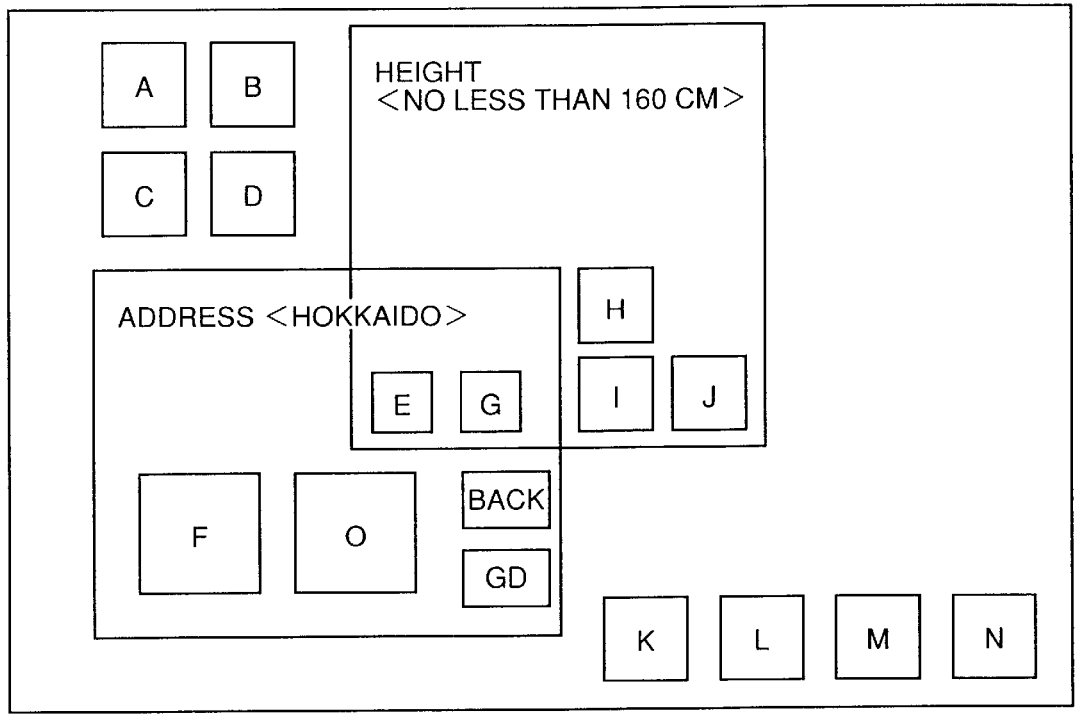
FIG. 15 is a view with two filters overlapped.

Reference will now be made to FIG. 14 to describe an example with more than one filter displayed. A first filter is provided, with the attribute "address" selected and a search condition "Hokkaido" set. A second filter is provided, with an attribute "height" selected and a search condition "no less than 160 cm in height" set. On the FIG. 14 screen, the filter having the attribute "address" is not displayed in the form of a map. The filter having the attribute "address" has two buttons, the BACK and GD buttons, displayed therein. On this screen the filters do not overlap and icons E and G belonging to both of the two filters are for example hatched and thus emphasized when they are displayed. When one filter is moved and thus overlaps the other filter, the screen is switched to the screen as shown in FIG. 15. Icons E and G satisfy the search conditions for the both filters. Thus icons E and G are displayed in an overlapping area of the two filters. More specifically, the addresses in the employee data corresponding to icons E and G are both "Hokkaido" and the heights therein are both "no less than 160 cm".

Figure 16:
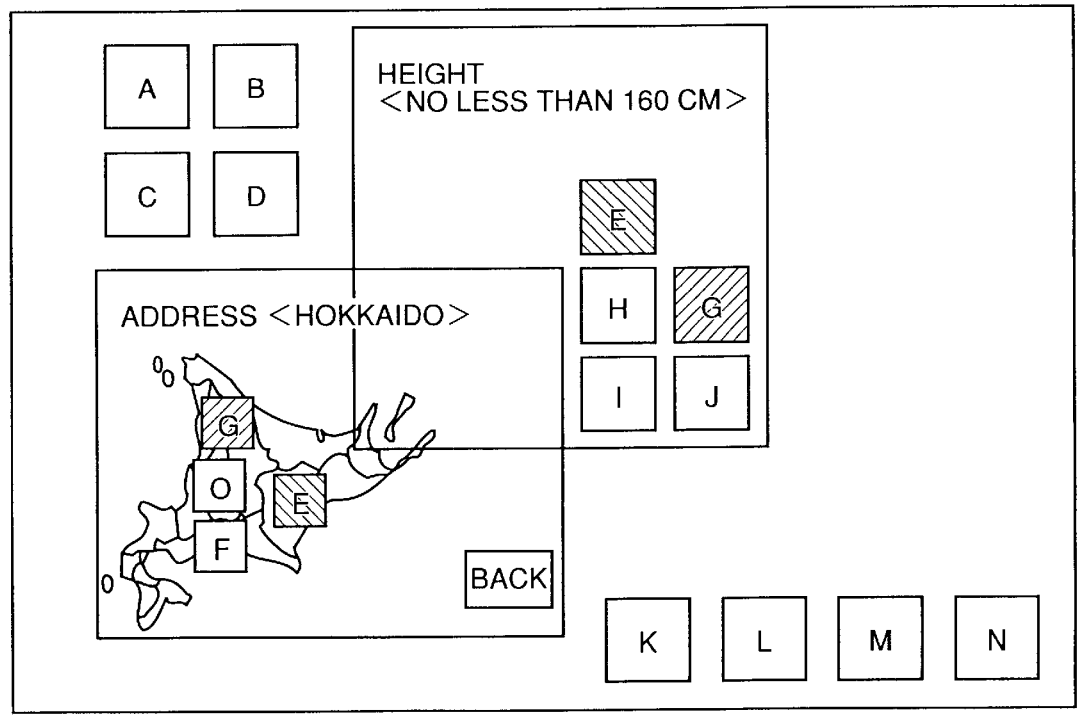
FIG. 16 is a view with two filters, one graphically displayed.

When in the filter with the attribute "address" the GD button is selected, the filter is switched to a map filter as shown in FIG. 16 and a map of Hokkaido is displayed. On the map of Hokkaido is displayed an icon indicative of data having an address corresponding to Hokkaido. For the map filter, it is important where in the filter an icon is positioned. As such, if icons E and G cannot be displayed in an area where the two filters overlap, then icons E and G are emphasized and thus displayed.

A description will now be provided of an example of searching the employee data, using a filter having an attribute "calendar".

Figure 17:
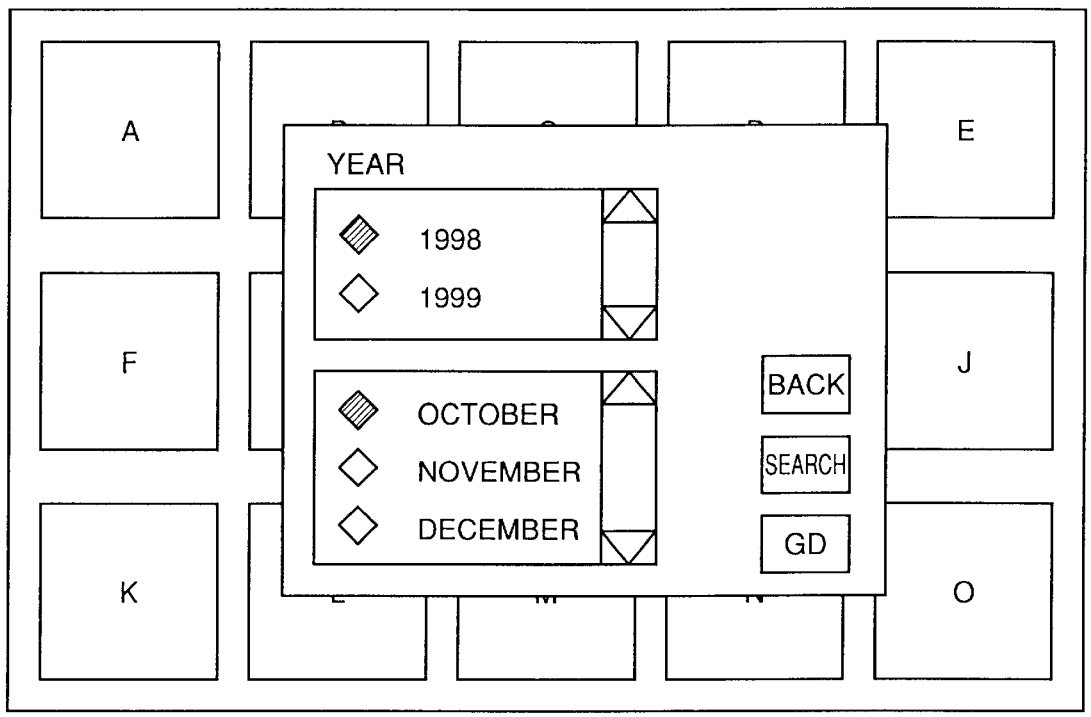
FIG. 17 shows an attribute-value select screen for an attribute "calendar".

When on the FIG. 4 attribute select screen the attribute "calendar" is selected, the screen is switched to such an attribute-value select screen as shown in FIG. 17. On this display screen, the attribute "calendar" has been selected and the attribute values of the attribute are displayed in the form of a list. The attribute values are adapted to have a previously set initial value. Beside the list, three buttons, GD, SEARCH and BACK buttons, are displayed.

When on this screen the BACK button is selected, the screen is switched to the FIG. 4 attribute select screen.

Figure 18:
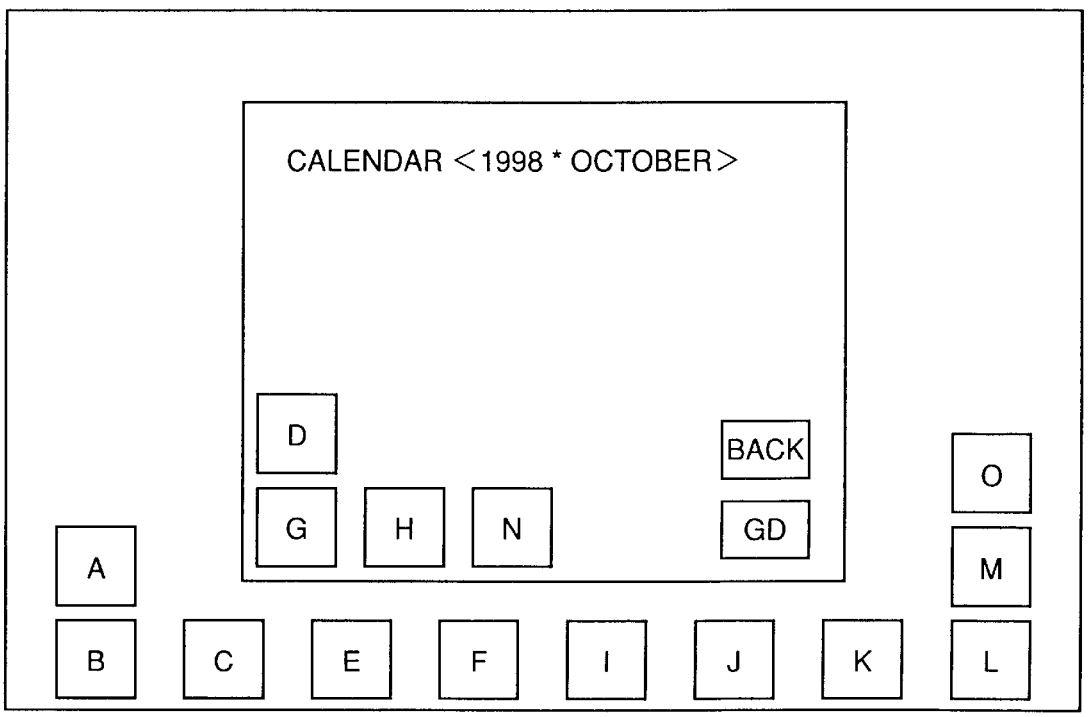
FIG. 18 is a view when the SEARCH button is selected with an attribute value "October 1998" used as a search condition.

When an attribute value is selected on the FIG. 17 attribute-value select screen, to indicate that the attribute value has been selected the button displayed on the left hand of the selected attribute value is displayed with a color different than those displayed on the left hand of the other attribute values. In FIG. 17, "October 1998" is selected as an attribute value. When on this screen the SEARCH button is selected, the data is searched according to the search condition "October 1998". Referring to FIG. 18, after the data is searched the screen is switched and an icon indicative of the data satisfying the search condition, i.e., an icon indicative of the employee data having a schedule in the October of 1998 is displayed in a filter corresponding to the search condition "October 1998". Furthermore, an icon indicative of the data failing to satisfy the search condition, i.e., an icon indicative of the employee data which does not have a schedule in the October of 1998 is displayed outside the filter. In the filter, two buttons, the BACK and GD buttons are also displayed. When on this screen the BACK button is selected, the screen is switched to the FIG. 17 screen.

Figure 19:
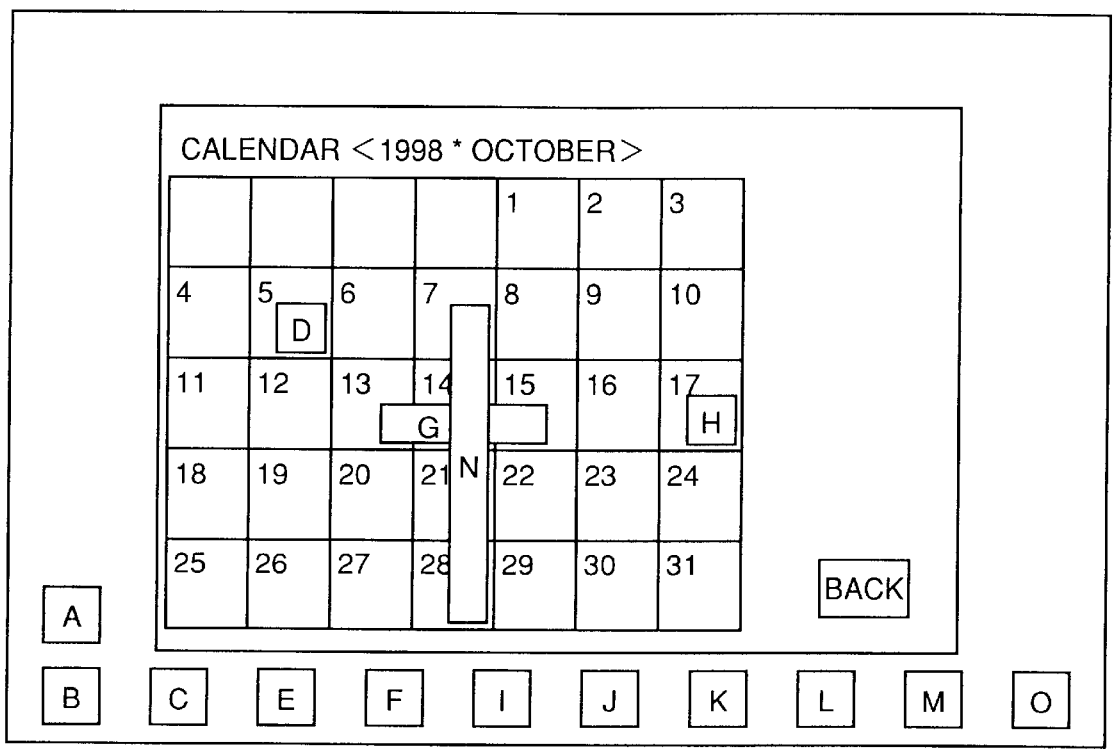
FIG. 19 is a view when the GD button is selected with the attribute value "October 1998" used as a search condition.

When in FIG. 17 or 18 the GD button is selected, the screen is switched to a screen with such a calendar filter as shown in FIG. 19. In this calendar filter, a calendar of the October of 1998 is displayed, with the icons indicative of the employee data displayed at the positions corresponding to the calendars in the employee data. For example, it can be seen that the employee corresponding to icon D has a schedule on Oct. 5, 1998, the employee corresponding to icon G has a schedule on Oct. 13–15, 1998, and that the employee corresponding to icon N has a schedule every Wednesday. The employee data are previously prioritized. Icon N overlying icon G indicates that the employee data corresponding to icon N has a priority higher than that corresponding to icon G. When in FIG. 19 the BACK button is selected, the screen is switched to the immediately previous screen (the FIG. 17 attribute-value select screen or the FIG. 18 screen).

Figure 20:
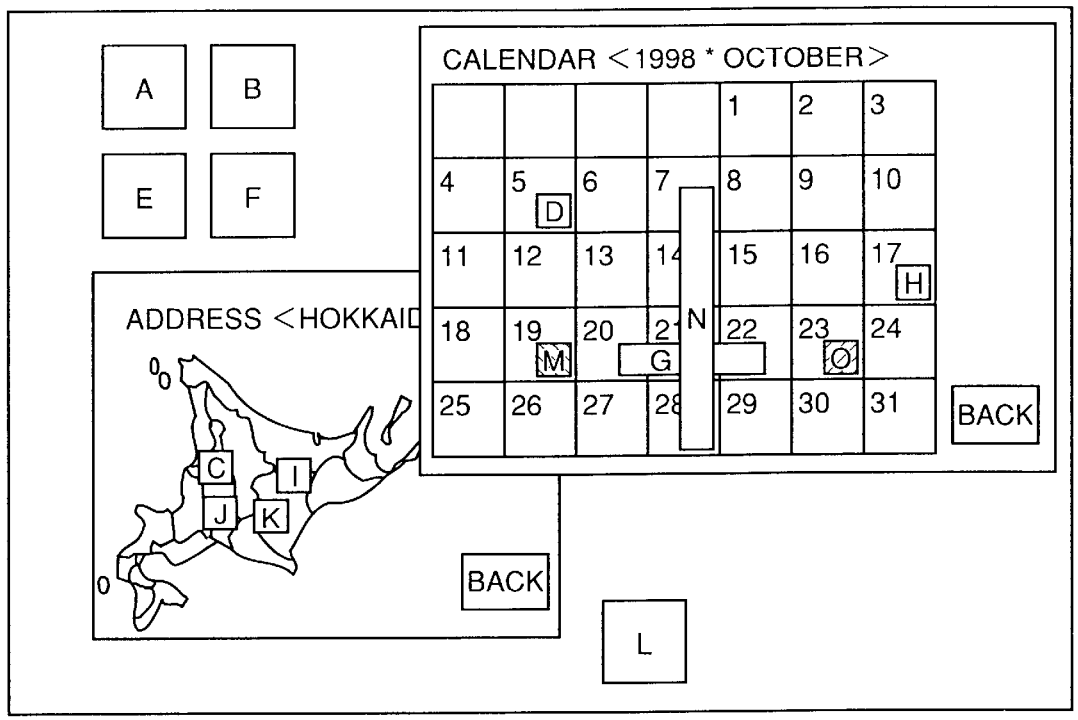
FIG. 20 is a view with two prioritized filters overlapped.

A description will now be provided of an example with more than one filter simultaneously displayed. While in the above description (FIGS. 14–16) the filters are not prioritized, they may be prioritized. Basically, a filter later created is adapted to have a priority higher than that previously created. Referring to FIG. 20, a calendar filter and a map filter are displayed on the same screen, the former adapted to have a priority higher than the latter. Thus the former overlies the latter. The employee data associated with icons M and O are the data satisfying both of a search condition for the calendar filter and that for the map filter. Icons M and O are displayed only in the prioritized, calendar filter and not in the other filter. Icons M and O are displayed with a color different than the other icons to indicate that icons M and O satisfy the multiple search conditions. It should be noted that in FIG. 20, icons M and O are hatched and thus displayed to indicate the color difference described above.

Figure 21:
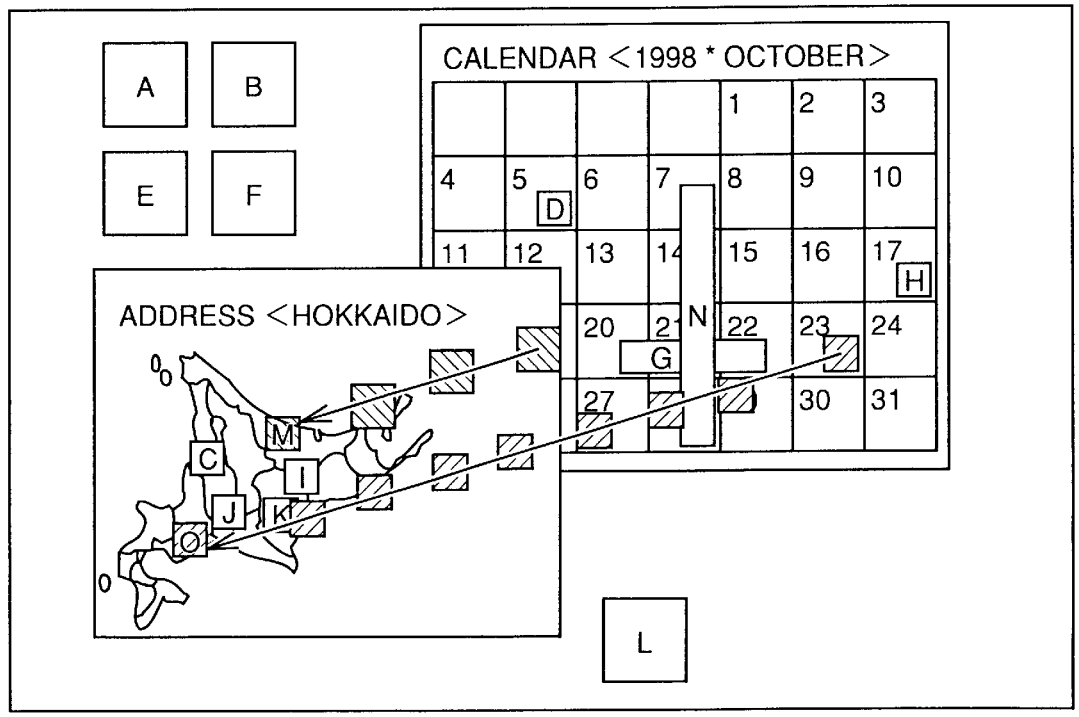
FIG. 21 illustrates a movement of an icon that is animated and thus displayed when the prioritization of the filters is changed.

When on the FIG. 20 screen the map filter is clicked and thus selected, the screen is switched to such a screen as shown in FIG. 21. More specifically, the prioritization is so changed that the priority of the map filter is higher than that of the calendar filter. When the map filter is prioritized, icons M and O moves from the calendar filter to the map filter while the icons are displayed. The movements of icons M and O are animated to more specifically show from where to where which icon moves.

FIGS. 22–30 are flow charts representing a procedure of the data search method in accordance with the present invention. Hereinafter with reference to the flow charts each process will be described.

Figure 22:
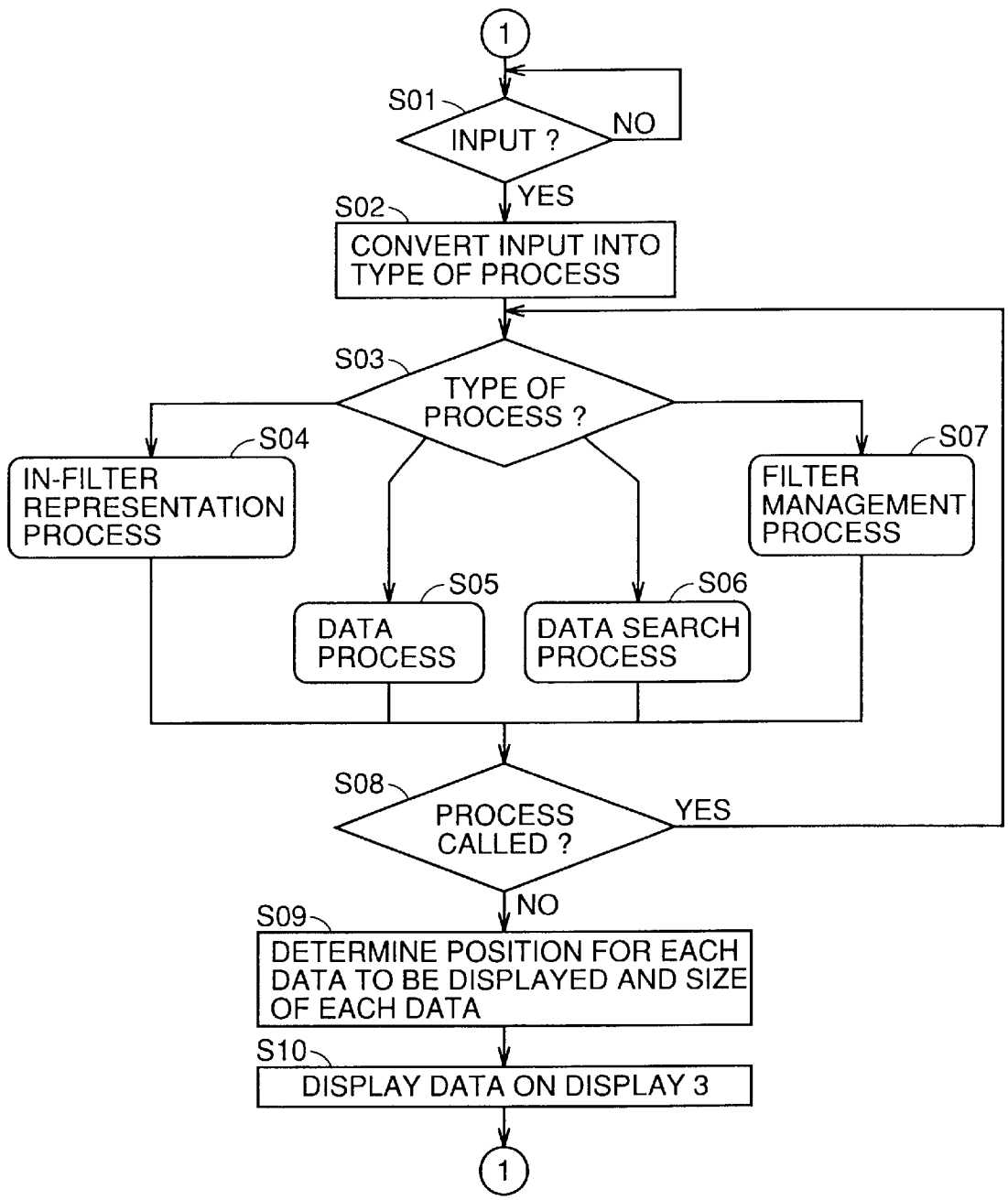
FIG. 22 is a flow chart of a data search process.

Referring to FIG. 22, the data search system waits for an instruction input by the user (S01). When the user inputs an instruction (YES at S01), the meaning of the input instruction is interpreted (S02). For example, if the user is dragging an edge of a filter displayed in a display area then the interpretation is made that an instruction to change the size of the filter has been input and in the procedure thereafter a process associated with the interpretation is executed.

If the type of the process of interest is an in-filter representation process then the in-filter representation process described later (S04) is performed. If it is a data process then the data process described later (S05) is performed. If it is a data search process then the data search process described later (S06) is performed. If it is a filter management process then the filter management process described later (S07) is performed.

After any of processes S04–S07 completes, the controls determine whether internal to each process another process is called (S08). If another process is called (YES at S08), the controls return to S03 and the called process is performed.

If another process is not called (NO at S08), the state determined by each process is referred to to determine the position at which the data of interest is displayed and the size of the data (S09). The data positioned and sized as determined by the S09 process is then displayed on display 3 (S10). Then the controls return to S01.

Figure 23:
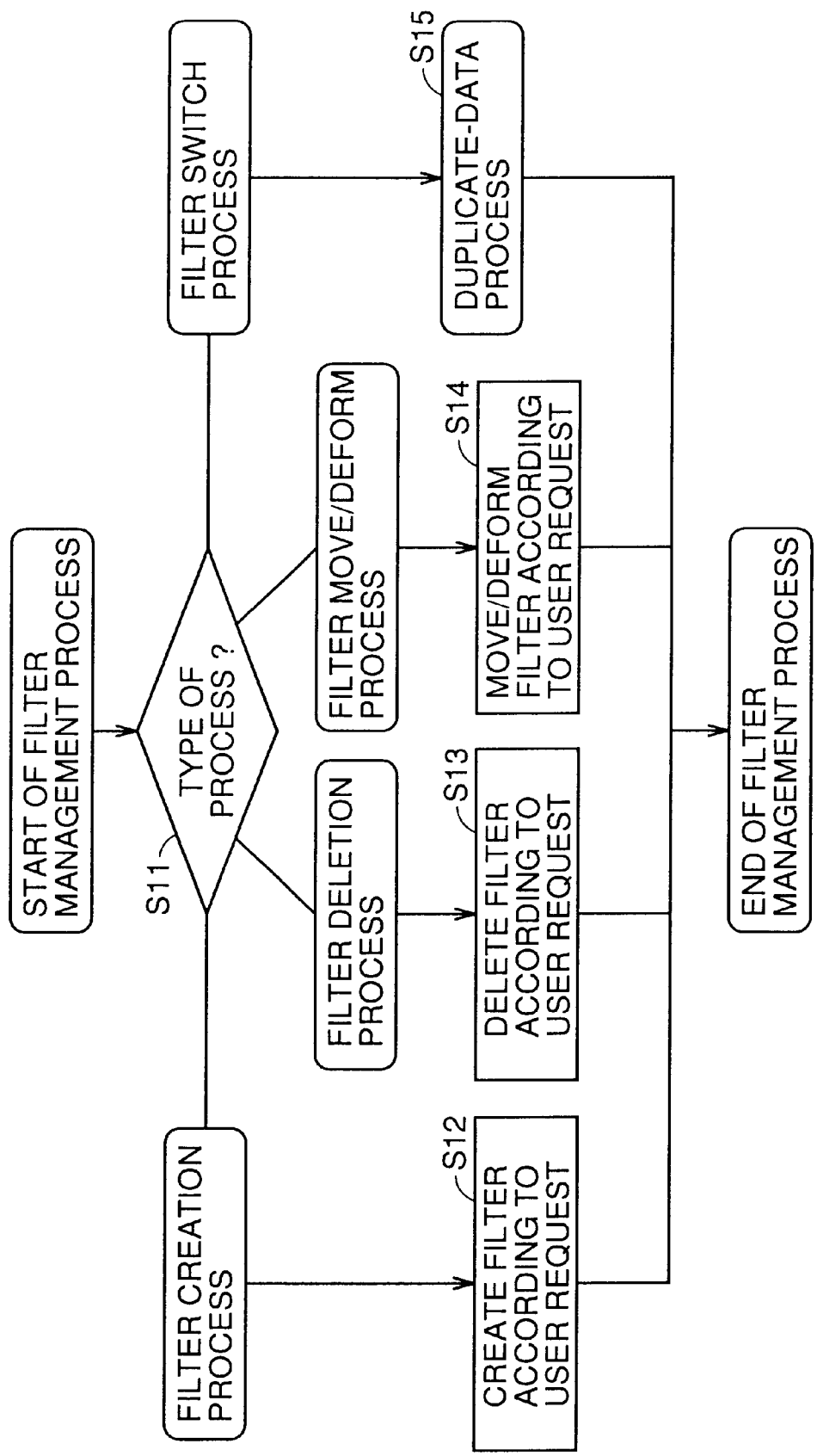
FIG. 23 is a flow chart of a filter management process.

Referring to FIG. 23, the filter management process (S07 of FIG. 22) will now be described in greater detail. When in response to an input from a user a filter is to be created (a filter creation process at S11), according to the request from the user a new filter is created (S12). When in response to an input from a user a filter is to be deleted (a filter deletion process at S11), according to the request from the user the filter is deleted (S13). When in response to an input from a user a filter is to be moved or deformed (a filter move/deform process at S11), according to the request from the user the filter's display position is moved or the filter is deformed (S14). When more than one filter existing on a screen are to be switched in level (a filter switch process at S11), the duplicate-data process described later (S15) is performed.

Figure 24:
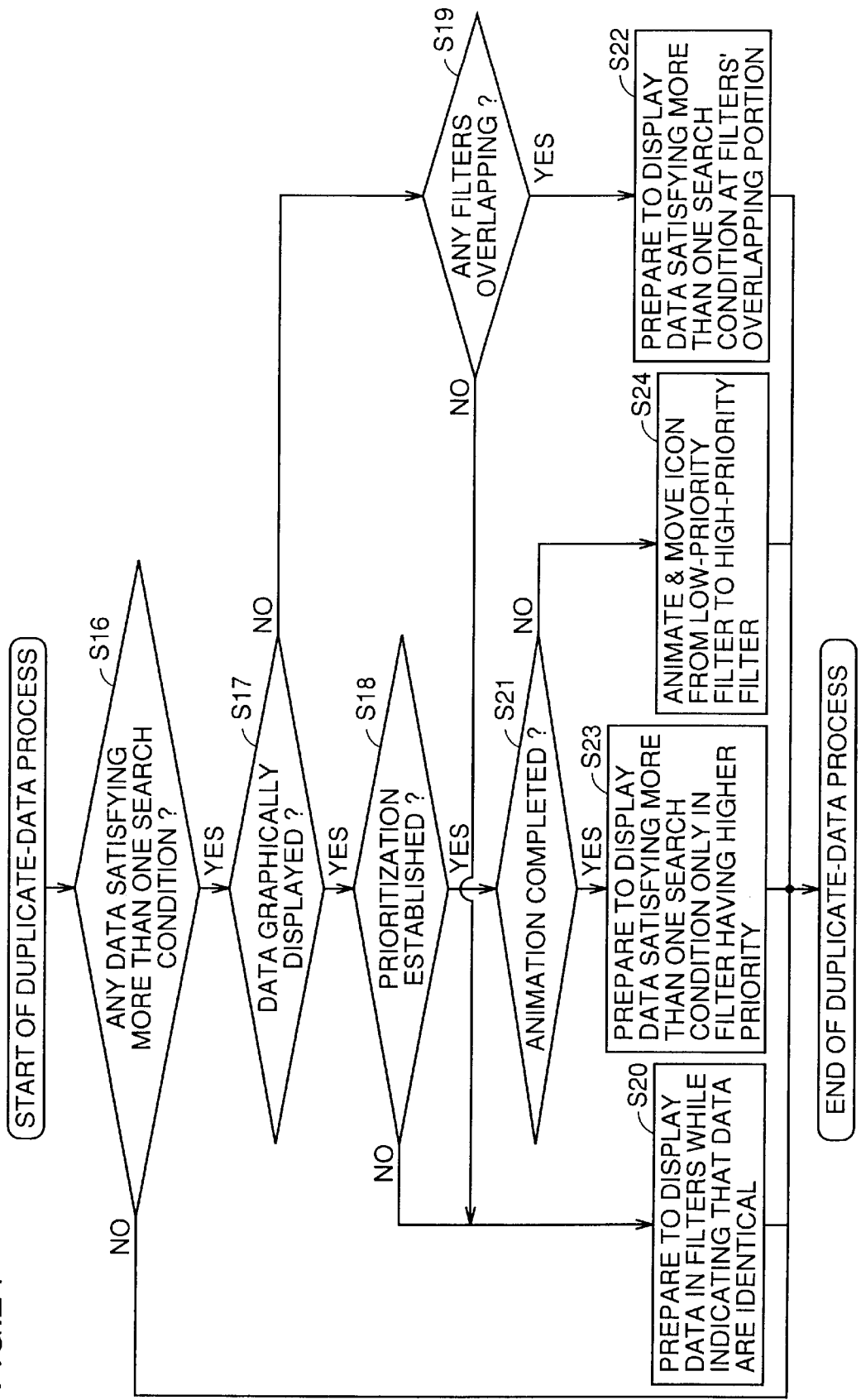
FIG. 24 is a flow chart of a duplicate-data process.

Reference will now be made to FIG. 24 to describe the duplicate-data process (S15 of FIG. 23). The controls determine whether there is any data satisfying the search conditions of more than one filter simultaneously (S16). If there is not any data satisfying the multiple search conditions (NO at S16), any processes is not performed.

If there is data satisfying more than one search condition (YES at S16), the controls determine whether the data is being displayed graphically (S17). If not (NO at S17), then the controls determine whether the filters overlap (S19). If the filters overlap (YES at S19), then the controls prepare to display any icons of the data satisfying the multiple search conditions at an area where the filters overlap (S22 of FIG. 15).

If the filters do not overlap (NO at S19), the controls perform a display enhancement process (FIG. 14), e.g., by using a single color to display the icons of data satisfying the plurality of search conditions, indicating that each icon is that of the same data, thus preparing to display the icon in the filters corresponding to the search conditions that the data satisfies. It should be noted that in emphasizing icons when they are displayed, the icons may be similarly hatched rather than displayed with the same color.

If the data is being displayed graphically (YES at S17), then the controls determine whether the filters have been prioritized (S18). If not (NO at S18), the S20 process described above is performed.

If the filters are prioritized (YES at S18), the controls determine whether the icon animation display operation has been completed (S21). If not (NO at S21), an icon of the data satisfying the multiple filters' search conditions is animated and thus moved on the display from a filter with a low priority to a filter with a high priority (FIG. 21) (S24).

If the icon animation display operation has been completed (YES at S21), then the controls prepare to display in the filter having the highest priority the icon of the data satisfying the search conditions of the multiple filters (S23 of FIG. 20).

When any of the S20 and S22–S24 processes completes, the duplicate-data process (S15 of FIG. 23) ends.

Figure 25:
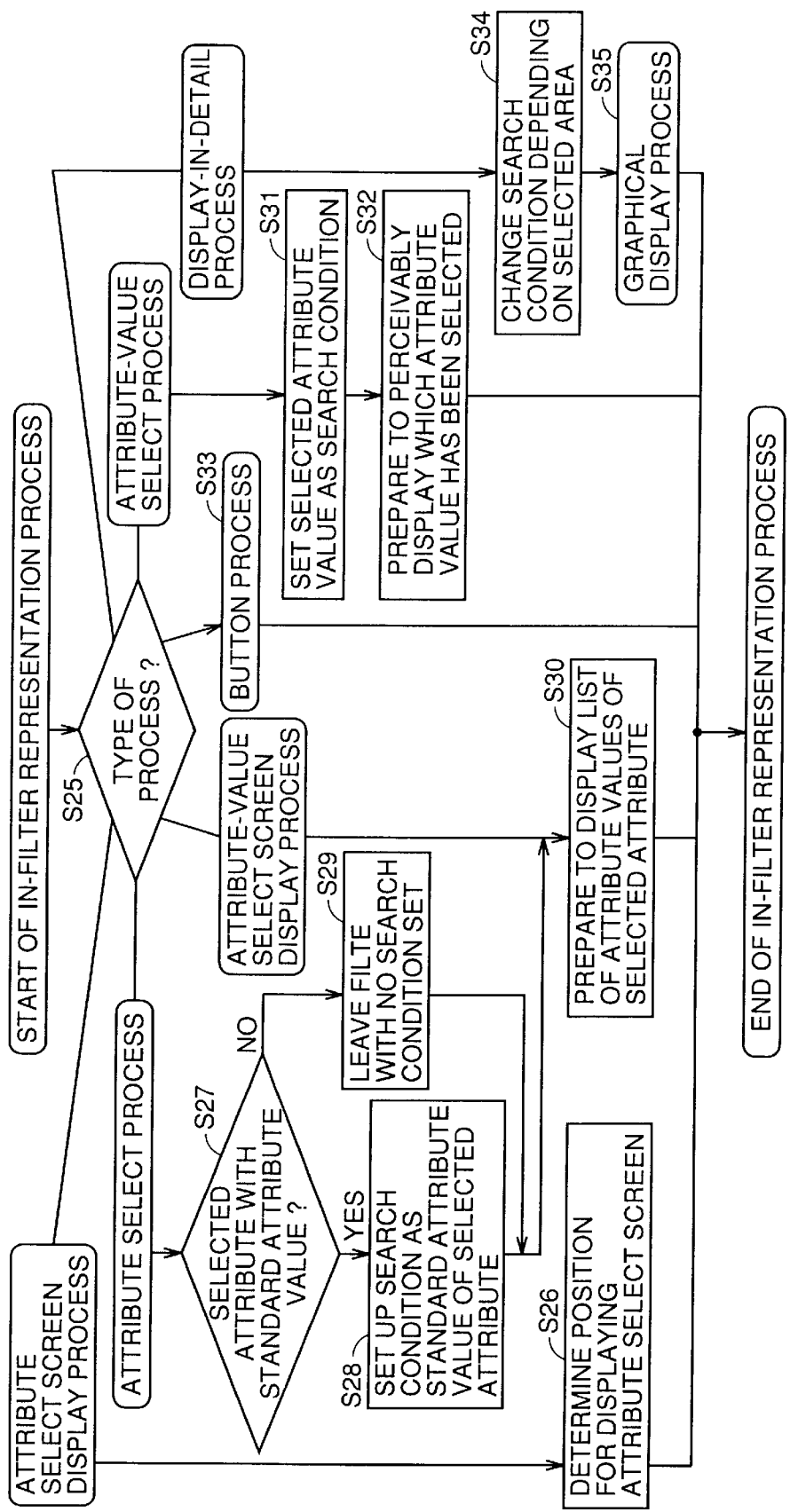
FIG. 25 is a flow chart of an in-filter representation process.

Reference will now be made to FIG. 25 to describe the in-filter representation process (S04 of FIG. 22). This process is performed after a filter is created in the S12 process of FIG. 23.

If a request is made to perform a process to display the attribute select screen (FIG. 4) (an attribute select screen display process at S25), then the controls determine at which position in a filter an attribute that can be selected is displayed (S26). If via an input from the user an attribute is selected for a filter (an attribute select process at S25), then the controls determine whether the selected attribute has a standard attribute value (S27). If so (YES at S27), the standard attribute value of the attribute is used as the filter's search condition (S28). If not (NO at S27), the filter remains with no search condition set (S29).

When a request is made to perform a process to display the attribute-value select screen (FIGS. 5, 8 and 17) (an attribute-value select screen display process at S25), or after the S28 or S29 process, the controls prepare to display in the filter a list of the attribute values of the attribute selected for the filter (S30).

When the user selects an attribute value (an attribute-value select process at S25), the controls set the selected attribute value as the filter's search condition and prepare to inform the user of the attribute value selected by the user, such as displayed as shown in FIGS. 8 and 17 (S32).

If the user selects the SEARCH button (a button process at S25), the button process described later is performed (S33). If the user selects an area on a map (a display-in-detail process at S25 of FIG. 12), an attribute value of the area selected by the user is applied as a search condition (S34) and the graphical display process described later (S35) is performed. After the S26, S30, S32, S33 or S35 process, the S08 process of FIG. 22 is performed.

Figure 26:
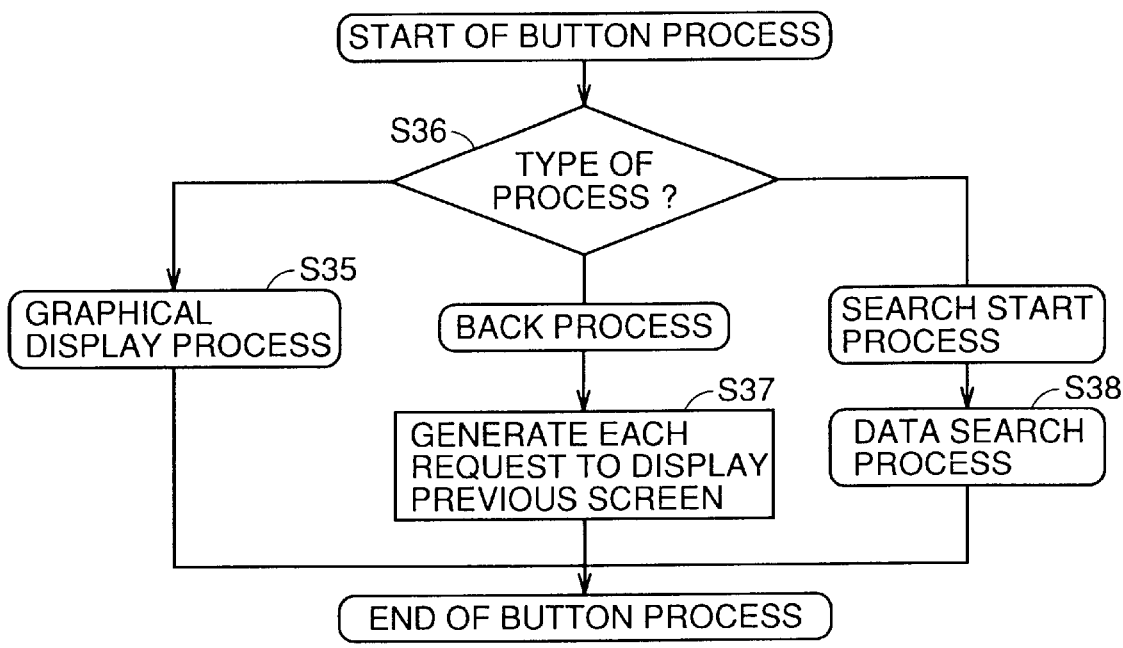
FIG. 26 is a flow chart of a button process.

Reference will now be made to FIG. 26 to describe the button process (S33 of FIG. 25). In the button process, a process is performed depending on the type of the selected button. If the SEARCH button is selected (a search start process at S36), the data search process described later is performed (S38). If the BACK button is selected (a back process at S36), the process associated with the state immediately preceding that displayed on the current screen is called (S37). If the GD button is selected (a graphical display process at S36), the graphical display process described later is performed (S35).

Figure 27:
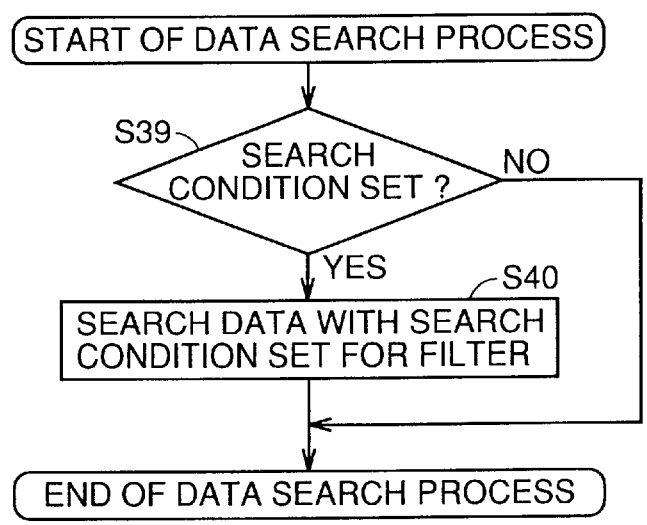
FIG. 27 is a flow chart of a data search process.

Reference will now be made to FIG. 27 to describe the data search process (S38 of FIG. 26). The controls determine whether a search condition is set for a filter (S39). If not (NO at S39), any process is not performed and the data search process ends. If so (YES at S39), data is searched according to the search condition set for the filter (S40). Then the data search process ends.

Figure 28:
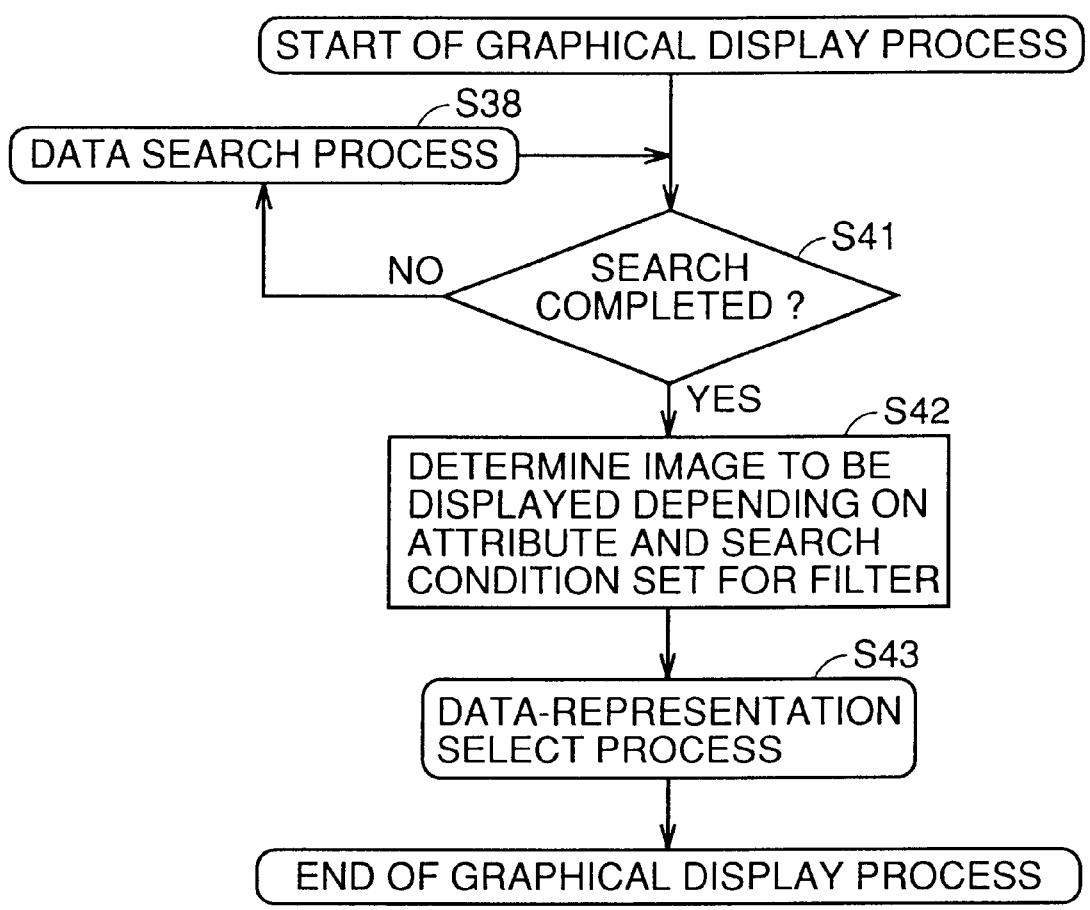
FIG. 28 is a flow chart of a graphical display process.

Reference will now be made to FIG. 28 to describe the graphical display process (S35 of FIG. 25 or 26). The controls determine whether data has been searched completely (S41). If not (NO at S41), the data search process as described above is performed (S38), as shown in FIG. 27, and the S41 process is then performed. If the data search process has been completed (YES at S41), an attribute and a search condition that are set for the filter are referred to to determine the image to be displayed (S42). Then the data-representation select process described later is performed (S43).

Figure 29:
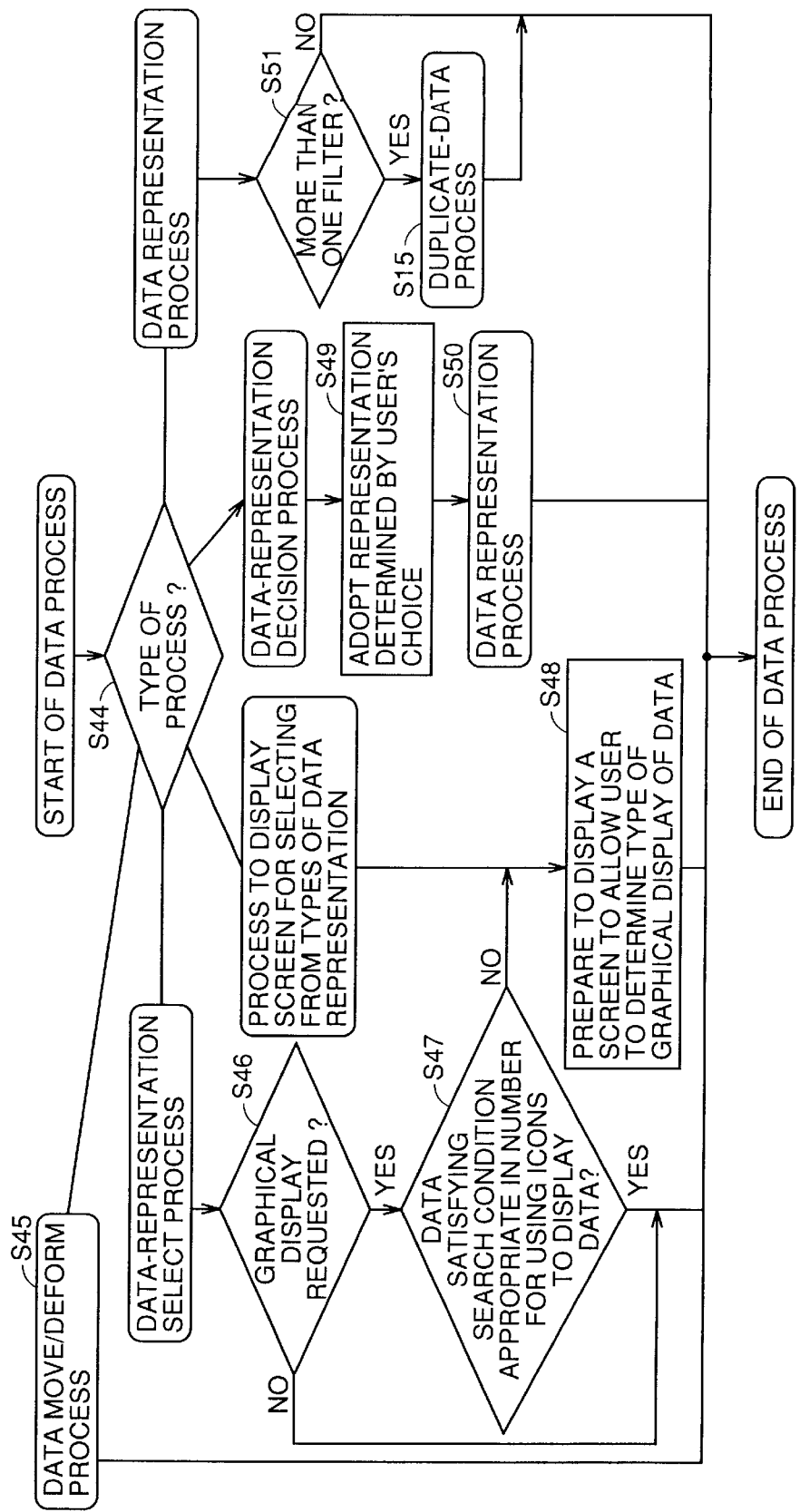
FIG. 29 is a flow chart of a data process.

Reference will now be made to FIG. 29 to describe the data process (S05 of FIG. 22). If the type of the process of interest corresponds to a data-representation select process (a data-representation select process at S44), the controls determine whether the filter of interest is being displayed graphically (S46). If not (NO at S46), then any process is not performed. If so (YES at S46), the controls determine whether the number of data displayed in the filter is an appropriate number for using icons to display the data (S47). If so (YES at S47), any process is not performed. If not (NO at S47), the controls prepare to display a screen (FIG. 11) to allow the user to determine how the data should be represented and displayed (S48). The S46–S48 processes above are also performed in FIG. 28 at S43.

If the type of the process of interest corresponds to a process to display a screen for selecting from various types of data representation (a process to display a screen for selecting from types of data representation at S44), the S48 process described above is performed.

When the user determines the data representation to be applied (a data-representation decision process at S44), the determined representation is used as the representation for the data of interest (S49) and the data representation process is performed (S50).

If the type of the process of interest is a data representation process (a data representation process at S44), the controls determine whether more than one filter exist (S51). If so (YES at S51), the duplicate-data process described above is performed, as shown in FIG. 24 (S15). The S51 and S15 processes above are also performed in FIG. 29 at S50.

If the user moves or deforms a data icon (a data move/deform process at S44), a data move/deform process is performed (S45).

Figure 30:
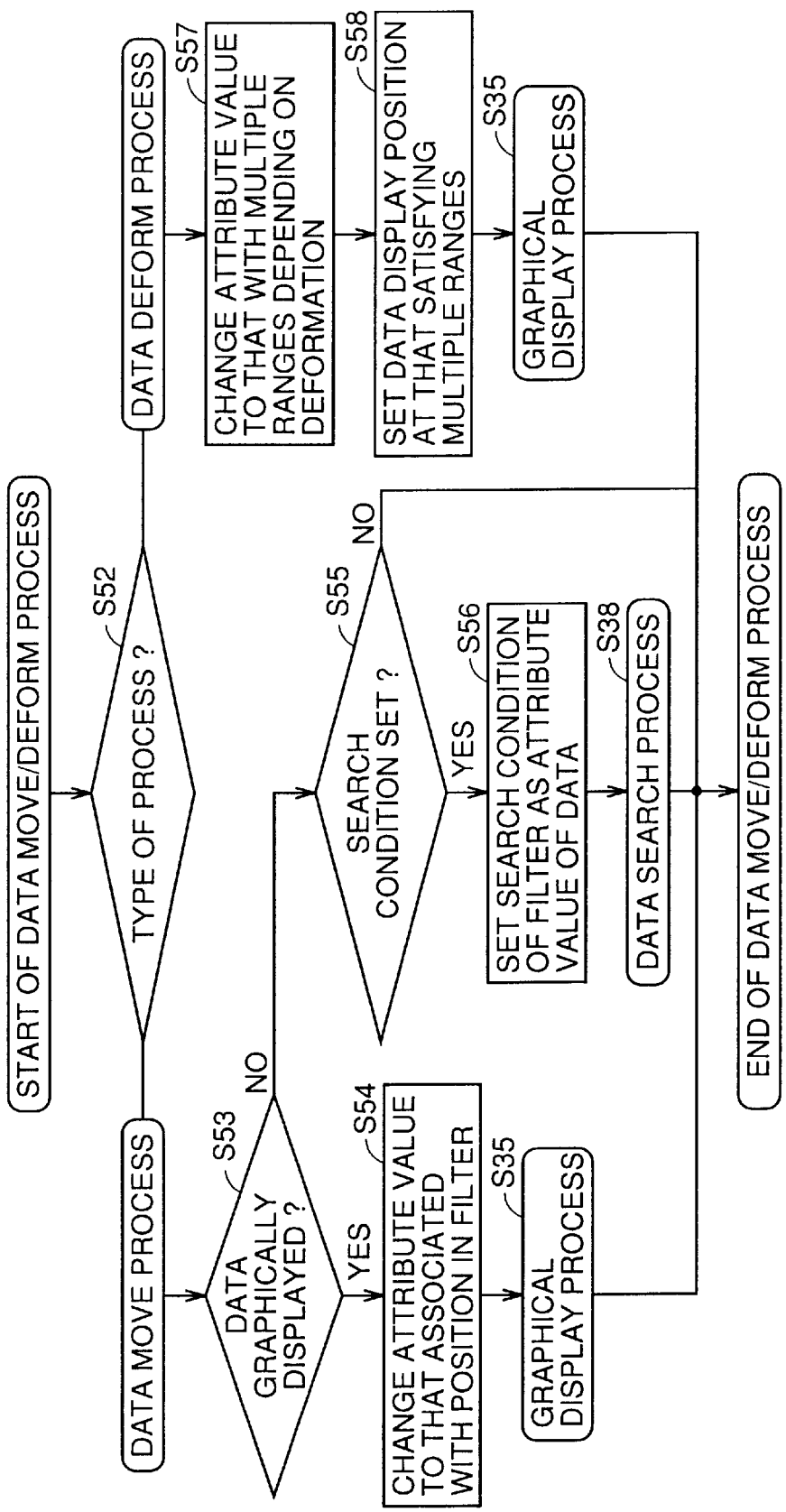
FIG. 30 is a flow chart of a data move/deform process.
Figure 31A:
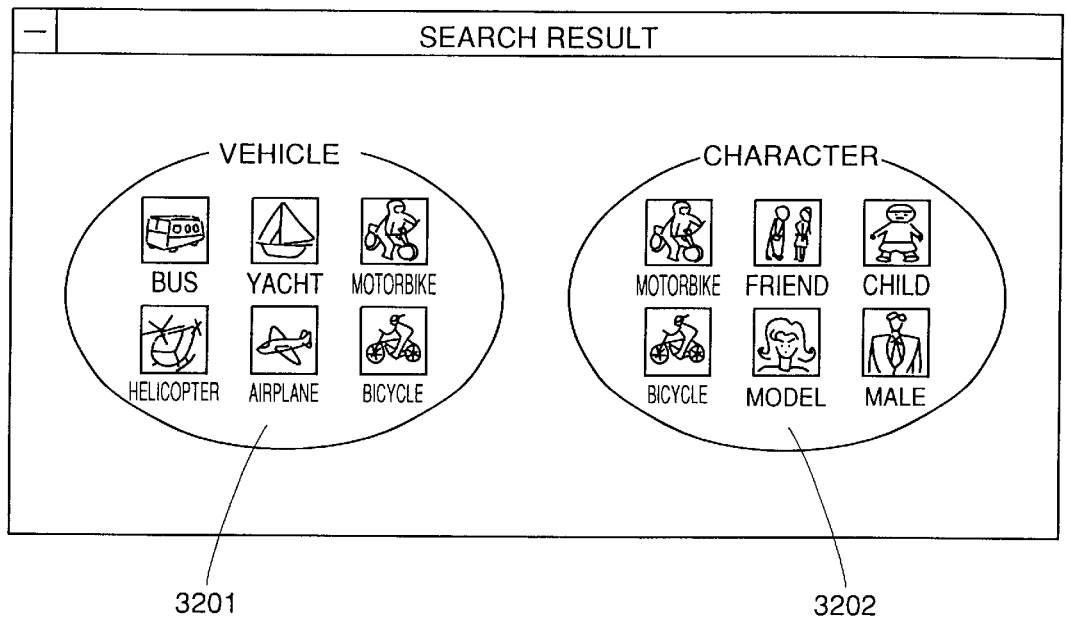
FIGS. 31A and 31B are views for illustrating a conventional data search method.
Figure 31B:
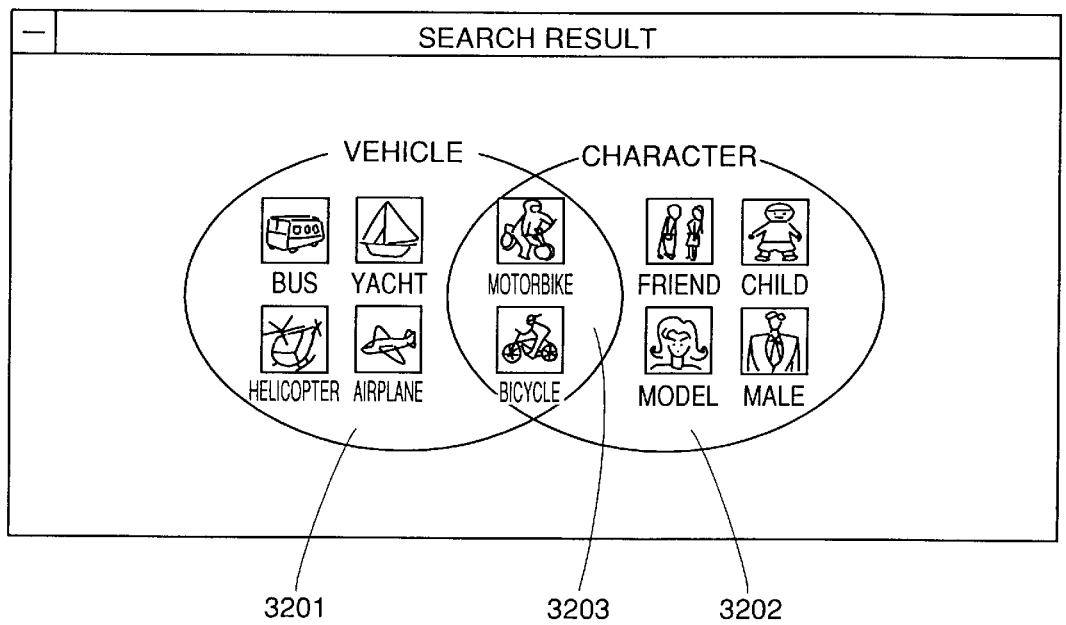

Reference will now be made to FIG. 30 to describe the data move/deform process (S45 of FIG. 29). If a data icon is moved (a data move process at S52), the controls determine whether the filter corresponding to the destination of the icon is being displayed graphically (S53). If so (YES at S53), an attribute value of the data associated with the moved icon is changed to an attribute value associated with a position in the filter displayed graphically (S54). Then the graphical display process is performed, as shown in FIG. 28 (S35). If the filter corresponding to the destination of the icon is not graphically displayed (NO at S53), the controls determine whether any search condition has been set for the filter corresponding to the icon's destination (S55). If not (NO at S55), any process is not performed. If so (YES at S55), the search condition set for the filter corresponding to the icon's destination is set as an attribute value of the moved data (S56). Then the data search process described above is performed, as shown in FIG. 27 (S38).

When a data icon is deformed (a data deformation process at S52), the data's attribute value is changed to an attribute value having more than one range depending on the shape of the deformed icon (S57). Furthermore, the position at which the deformed icon is displayed is changed to meet the multiple attribute-value ranges (S58). Then the graphical display process described above is performed, as shown in FIG. 28 (S35).

Thus, in the data search system of the present invention, in a filter each location is associated with an attribute value. As such, if a search condition is complex, data can be searched without increasing the number of filters. Thus the data search system of the present invention can achieve high data visibility.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a data search method including
a storage disposed to store a plurality of data to be administered and attribute values associated with a desired number of attributes and respectively assigned to said plurality of data,
a display,
an input unit receiving an instruction to perform an operation from a user through a user operation to be performed on an object displayed on said display, and
a data operation unit responsive to the instruction received by said input unit for performing an operation on said plurality of data, a data search method comprising the steps of:
creating a filter associated with a plurality of attribute values each associated with a predetermined display position;
defining a data attribute and a data attribute value associated with said filter for search;
using said data attribute and said data attribute value to search data; and
displaying a symbol of retrieved data in said filter at a display position corresponding to an attribute value of said data.

2. The data search method of claim 1, wherein if said data retrieved has more than one attribute value the symbol of said data is displayed at a single position in filters associated with more than one attribute value.

3. The data search method of claim 1, further comprising the steps of:
receiving a request generated to display a symbol not associated with a position;
creating a filter associated with said data attribute and said data attribute value for search and having an attribute value not associated with a display position; and
sorting a symbol of said data retrieved and thus displaying the symbol of said data retrieved either inside or outside said filter.

4. The data search method of claim 1, wherein the step of displaying in said filter at a display position includes the steps of:
determining whether a number of said data retrieved is an appropriate number for using icons to display said data retrieved;
if the number of said data retrieved is an appropriate number for using icons to display said data retrieved, displaying an icon of said data retrieved in said filter at a display position corresponding to an attribute value of said data; and
if the number of said data retrieved is an inappropriate number for using icons to display said data retrieved, allowing an user to select a representation for said data retrieved and, according to the selected representation, displaying said data retrieved in said filter.

5. The data search method of claim 1, wherein the step of creating includes the step of creating a plurality of filters each associated with a plurality of attribute values each associated with a predetermined display position.

6. The data search method of claim 5, wherein the step of displaying in said filter at a display position includes the steps of:
displaying a symbol of retrieved data in said filter at a display position corresponding to an attribute value of said data; and
emphasizing and thus displaying the symbol of said data if the symbol of said data is displayed in more than one filter.

7. The data search method of claim 5, said plurality of filters being prioritized, the step of displaying in said filter at a display position includes the steps of:

superposing on a filter a filter having a high priority; and if said data retrieved satisfies search conditions associated with more than one filter, displaying a symbol of said data in a filter having the highest priority, and emphasizing the symbol of said data therein.

8. The data search method of claim 7, further comprising the steps of:

detecting that a filter has been selected;

setting a priority of said filter selected higher than that of a filter overlapping said filter selected;

of symbols of data displayed in said filter overlapping said filter selected, animating and thus moving a symbol to be displayed in said filter selected, and displaying in said filter selected the symbol to be displayed in said filter selected.

9. The data search method of claim 1, further comprising the steps of:

detecting that in a filter an area has been selected; and enlarging and thus displaying the selected area and displaying in the enlarged and displayed area at a display position a symbol of data having an attribute value associated with the selected area.

10. The data search method of claim 1, further comprising the steps of:

detecting that a symbol of data has been moved to and arrived at a filter associated with a plurality of attribute values each associated with a predetermined display position; and changing an attribute value of said data moved, to an attribute value associated with a display position corresponding to a destination of said data.

11. A data search system comprising:

a storage disposed to store a plurality of data to be administered and attribute values associated with a desired number of attributes and respectively assigned to said plurality of data;

a display;

an input unit receiving an instruction to perform an operation from a user through a user operation to be performed on an object displayed on said display;

a filter creation unit creating a filter associated with a plurality of attribute values each associated with a predetermined display position;

an attribute definition unit defining a data attribute and a data attribute value associated with said filter for search;

a data search unit using said data attribute and said data attribute value to search data; and a data display unit displaying a symbol of retrieved data in said filter at a display position depending on an attribute value of said data on said display.

12. A computer-readable recording medium storing a data search program allowing a computer to implement a data search method storing a plurality of data to be administered and attribute values associated with a desired number of attributes and respectively assigned to said plurality of data, and performing an operation on said plurality of data in response to an instruction to perform an operation from an user through a user operation to be performed on an object displayed on a display, said data search method comprises the steps of:

creating a filter associated with a plurality of attribute values each associated with a predetermined display position;

defining a data attribute and a data attribute value associated with said filter for search;

using said data attribute and said data attribute value to search data; and displaying a symbol of retrieved data in said filter at a display position corresponding to an attribute value of said data.

* * * * *